United States Patent
Shrestha et al.

(10) Patent No.: US 12,192,749 B2
(45) Date of Patent: Jan. 7, 2025

(54) NETWORK TRIGGERED HANDOVER

(71) Applicant: QUALCOMM Incorporated, San Diego, CA (US)

(72) Inventors: Bharat Shrestha, San Diego, CA (US); Prasad Reddy Kadiri, San Diego, CA (US); Umesh Phuyal, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/322,797

(22) Filed: May 17, 2021

(65) Prior Publication Data

US 2021/0368407 A1    Nov. 25, 2021

Related U.S. Application Data

(60) Provisional application No. 63/027,225, filed on May 19, 2020.

(51) Int. Cl.
*H04W 36/24* (2009.01)
*H04W 36/00* (2009.01)
*H04W 84/06* (2009.01)

(52) U.S. Cl.
CPC . *H04W 36/00837* (2018.08); *H04W 36/0058* (2018.08); *H04W 36/00725* (2023.05); *H04W 36/0077* (2013.01); *H04W 36/0079* (2018.08); *H04W 36/00838* (2023.05); *H04W 36/249* (2023.05); *H04W 84/06* (2013.01)

(58) Field of Classification Search
USPC ...................................................... 370/331
See application file for complete search history.

(56) References Cited

U.S. PATENT DOCUMENTS 8,909,227 B2    12/2014  Kitazoe et al.
10,708,827 B2 *  7/2020  Toth .................... H04W 64/003
(Continued)

FOREIGN PATENT DOCUMENTS

WO    WO-2008042906         4/2008
WO    WO-2019138155 A1      7/2019
WO    WO-2021107608 A1 *   6/2021  ........ H04W 36/0055

OTHER PUBLICATIONS

NPL "Apparatus and Methods For Performing Handover in Wireless Communication Systems" published in English on Nov. 25, 2019, (hereinafter 2019_NPL) (https://patentscope.wipo.int/search/en/detail.jsf?docId=KR327263178&_fid=KR327263178) (Year: 2019).*

(Continued)

*Primary Examiner* — Gregory B Sefcheck
*Assistant Examiner* — Majid Esmaeilian
(74) *Attorney, Agent, or Firm* — Holland & Hart LLP

(57) ABSTRACT

Methods, systems, and devices for wireless communications are described. The described techniques may provide for efficiently triggering a handover at a user equipment (UE) from a source cell to a target cell. The UE may receive, at a first time period, a first control message including a configuration of a target cell to use at a second time period for performing a handover procedure from a source cell to a target cell. The UE may then receive, at the second time period, a second control message triggering the UE to perform the handover procedure from the source cell to the target cell. The UE may use the configuration of the target cell received in the first control message to perform a handover procedure from the source cell to the target cell at the second time period in response to receiving the second control message.

29 Claims, 18 Drawing Sheets

(56) References Cited

U.S. PATENT DOCUMENTS

| | | | | |
|---|---|---|---|---|
| 10,791,562 | B2* | 9/2020 | Ryoo | H04W 72/0453 |
| 2013/0040645 | A1* | 2/2013 | Nishida | H04W 72/56 |
| | | | | 455/436 |
| 2014/0036776 | A1* | 2/2014 | Al-Shalash | H04W 36/0033 |
| | | | | 370/328 |
| 2017/0230104 | A1 | 8/2017 | Purkayastha et al. | |
| 2018/0063755 | A1* | 3/2018 | Chong | H04W 36/0022 |
| 2019/0053193 | A1* | 2/2019 | Park | H04W 56/0045 |
| 2019/0191344 | A1* | 6/2019 | Wen | H04W 36/0061 |
| 2019/0246323 | A1* | 8/2019 | Kim | H04W 36/305 |
| 2019/0246328 | A1* | 8/2019 | Qiao | H04W 36/0058 |
| 2019/0261260 | A1* | 8/2019 | Dao | H04W 48/00 |
| 2020/0037210 | A1* | 1/2020 | Rugeland | H04W 36/0033 |
| 2020/0396650 | A1* | 12/2020 | Nakarmi | H04W 8/08 |
| 2021/0136641 | A1* | 5/2021 | Roy | H04W 56/0015 |
| 2021/0243656 | A1* | 8/2021 | Paterson | H04W 36/087 |
| 2022/0014985 | A1* | 1/2022 | Da Silva | H04W 76/27 |
| 2022/0167223 | A1 | 5/2022 | Shrestha et al. | |
| 2022/0191752 | A1* | 6/2022 | Rune | H04W 36/0058 |
| 2022/0217594 | A1* | 7/2022 | Kim | H04W 36/38 |
| 2022/0264407 | A1* | 8/2022 | Sharma | H04W 84/045 |
| 2023/0014613 | A1* | 1/2023 | Je | H04W 36/0058 |
| 2023/0059975 | A1* | 2/2023 | Wu | H04W 48/20 |
| 2023/0262545 | A1* | 8/2023 | Stanczak | H04W 36/305 |
| | | | | 370/331 |

OTHER PUBLICATIONS

3GPP TR 38.821: "3rd Generation Partnership Project; Technical Specification Group Radio Access Network; Solutions for NR to Support Non-Terrestrial Networks (NTN) (Release 16)", 3GPP Standard, Technical Report, 3GPP TR 38.821, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020 (Jan. 16, 2020), pp. 1-140, XP051860814, Retrieved from the Internet: URL: ftp://ftp.3gpp.org/Specs/archive/38_series/38.821/38821-g00.zip. 38821-g00.doc [Retrieved on Jan. 16, 2020] paragraphs [04.1], [6.3.4],[07.3], [09.2].

Ericsson: "CHO for NTN LEO", 3GPP Draft, 3GPP TSG-RAN WG2 #108, R2-1916393, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 23, 2019 (Nov. 23, 2019), XP051828895, 5 Pages, Retrieved from the Internet: URL: https://ftp.3gpp.org/tsg_ran/WG2_RL2/TSGR2_108/Docs/R2-1916393.zip. R2-1916393 CHO for NTN v2.docx. [Retrieved on Nov. 23, 2019] the whole document.

Interdigital Inc, "Mobility Enhancements for Non-Terrestrial Networks", 3GPP Draft, 3GPP RAN WG2 Meeting #106, R2-1908245, Mobility Enhancements for Non-Terrestrial Networks, 3rd Generation Partnership Project (3GPP), Mobile Competence Centre, 650, Route Des Lucioles, F-06921 Sophia-Antipolis Ce, vol. RAN WG2, No. Reno, United States, May 13, 2019-May 17, 2019, May 18, 2019 (May 18, 2019), XP051740398, 6 Pages, Retrieved from the Internet: URL: http://www.3gpp.org/ftp/tsg%5Fran/WG2%5FRL2/TSGR2%5F106/Docs/R2%2D1908245%2Ezip. [Retrieved on May 18, 2019] the whole document.

International Search Report and Written Opinion—PCT/US2021/032923—ISA/EPO—Sep. 9, 2021.

* cited by examiner

NETWORK TRIGGERED HANDOVER

CROSS REFERENCE

The present application for patent claims the benefit of U.S. Provisional Patent Application No. 63/027,225 by SHRESTHA et al., entitled "NETWORK TRIGGERED HANDOVER," filed May 19, 2020, assigned to the assignee hereof, and expressly incorporated by reference herein.

INTRODUCTION

The following relates to wireless communications and more specifically to coordinating handovers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include receiving, from a satellite at a first time period, a first control message including a configuration of a target cell to use at a second time period for performing a handover procedure from a source cell to the target cell, the second time period occurring after the first time period, receiving, from the satellite at the second time period, a second control message triggering the UE to perform the handover procedure from the source cell to the target cell, and performing the handover procedure from the source cell to the target cell using the configuration of the target cell included in the first control message in response to receiving the second control message.

An apparatus for wireless communication at a UE is described. The apparatus may include a processor, and memory coupled to the processor. The processor and memory may be configured to receive, from a satellite at a first time period, a first control message including a configuration of a target cell to use at a second time period for performing a handover procedure from a source cell to the target cell, the second time period occurring after the first time period, receive, from the satellite at the second time period, a second control message triggering the UE to perform the handover procedure from the source cell to the target cell, and perform the handover procedure from the source cell to the target cell using the configuration of the target cell included in the first control message in response to receiving the second control message.

Another apparatus for wireless communication at a UE is described. The apparatus may include means for receiving, from a satellite at a first time period, a first control message including a configuration of a target cell to use at a second time period for performing a handover procedure from a source cell to the target cell, the second time period occurring after the first time period, means for receiving, from the satellite at the second time period, a second control message triggering the UE to perform the handover procedure from the source cell to the target cell, and means for performing the handover procedure from the source cell to the target cell using the configuration of the target cell included in the first control message in response to receiving the second control message.

A non-transitory computer-readable medium storing code for wireless communication at a UE is described. The code may include instructions executable by a processor to receive, from a satellite at a first time period, a first control message including a configuration of a target cell to use at a second time period for performing a handover procedure from a source cell to the target cell, the second time period occurring after the first time period, receive, from the satellite at the second time period, a second control message triggering the UE to perform the handover procedure from the source cell to the target cell, and perform the handover procedure from the source cell to the target cell using the configuration of the target cell included in the first control message in response to receiving the second control message.

In some examples of the method, apparatuses, and non-transitory computer-readable medium described herein, the first control message includes an indication of the second time period.

In some examples of the method, apparatuses, and non-transitory computer-readable medium described herein, the handover procedure includes a conditional handover procedure after receiving the second control message, and performing the handover procedure may include operations, features, means, or instructions for performing that conditional handover procedure based on at least one criterion for performing the conditional handover procedure being satisfied.

Some examples of the method, apparatuses, and non-transitory computer-readable medium described herein may further include operations, features, means, or instructions for receiving, in the second control message, an indication of reserved resources for performing contention-free random-access to connect to the target cell or for performing the handover procedure to the target cell without a random-access procedure.

Some examples of the method, apparatuses, and non-transitory computer-readable medium described herein may further include operations, features, means, or instructions for selecting a cell different from the target cell with which the UE may be to establish a connection based on a failure of the handover procedure or aborting the handover procedure and establishing the connection with the cell using the configuration of the target cell received in the first control message.

Some examples of the method, apparatuses, and non-transitory computer-readable medium described herein may further include operations, features, means, or instructions for transmitting, to the source cell, an indication that the handover procedure failed or was aborted at some point, where the indication that the handover procedure failed or was aborted at some point includes a response to the second control message or a latest measurement report.

In some examples of the method, apparatuses, and non-transitory computer-readable medium described herein, the first control message includes a set of multiple configurations of a set of multiple target cells to use for performing handover procedures to the set of multiple target cells.

Some examples of the method, apparatuses, and non-transitory computer-readable medium described herein may further include operations, features, means, or instructions for receiving an indication to release at least one of the set of multiple configurations of the set of multiple target cells and releasing the at least one of the set of multiple configurations.

In some examples of the method, apparatuses, and non-transitory computer-readable medium described herein, the second control message indicates that a context of the UE may be relocated to the target cell.

In some examples of the method, apparatuses, and non-transitory computer-readable medium described herein, the second control message indicates that a time-to-trigger (TTT) timer for performing the handover procedure shall expire or may be reduced if the TTT timer may be running.

In some examples of the method, apparatuses, and non-transitory computer-readable medium described herein, the second control message indicates that resources reserved for at least one of a plurality of target cells are activated or provides a new resource for performing synchronization to at least one of the plurality of target cells.

In some examples of the method, apparatuses, and non-transitory computer-readable medium described herein, the second control message includes a downlink control information message, a medium access control (MAC) control element, or a radio resource control (RRC) message.

In some examples of the method, apparatuses, and non-transitory computer-readable medium described herein, the second control message may be specific to the UE or specific to a group of UEs including the UE.

In some examples of the method, apparatuses, and non-transitory computer-readable medium described herein, the UE, the source cell, and the target cell may be operating in a non-terrestrial network (NTN).

A method for wireless communication at a source cell is described. The method may include transmitting a first control message to a UE including a configuration of a target cell for the UE to use to perform a handover procedure from the source cell to the target cell, the first control message being transmitted at a first time period and transmitting a second control message to the UE triggering the UE to perform the handover procedure from the source cell to the target cell using the configuration of the target cell based on a triggering condition, the second control message being transmitted at a second time period, the second time period occurring after the first time period.

An apparatus for wireless communication at a source cell is described. The apparatus may include a processor, and memory coupled to the processor. The processor and memory may be configured to transmit a first control message to a UE including a configuration of a target cell for the UE to use to perform a handover procedure from the source cell to the target cell, the first control message being transmitted at a first time period and transmit a second control message to the UE triggering the UE to perform the handover procedure from the source cell to the target cell using the configuration of the target cell based on a triggering condition, the second control message being transmitted at a second time period, the second time period occurring after the first time period.

Another apparatus for wireless communication at a source cell is described. The apparatus may include means for transmitting a first control message to a UE including a configuration of a target cell for the UE to use to perform a handover procedure from the source cell to the target cell, the first control message being transmitted at a first time period and means for transmitting a second control message to the UE triggering the UE to perform the handover procedure from the source cell to the target cell using the configuration of the target cell based on a triggering condition, the second control message being transmitted at a second time period, the second time period occurring after the first time period.

A non-transitory computer-readable medium storing code for wireless communication at a source cell is described. The code may include instructions executable by a processor to transmit a first control message to a UE including a configuration of a target cell for the UE to use to perform a handover procedure from the source cell to the target cell, the first control message being transmitted at a first time period and transmit a second control message to the UE triggering the UE to perform the handover procedure from the source cell to the target cell using the configuration of the target cell based on a triggering condition, the second control message being transmitted at a second time period, the second time period occurring after the first time period.

Some examples of the method, apparatuses, and non-transitory computer-readable medium described herein may further include operations, features, means, or instructions for transmitting, to the target cell, a request for the target cell to validate the configuration of the target cell included in the first control message.

Some examples of the method, apparatuses, and non-transitory computer-readable medium described herein may further include operations, features, means, or instructions for receiving, from the target cell, an acknowledgment that the configuration of the target cell may be validated, where transmitting the second control message further includes and transmitting the second control message based on receiving the acknowledgment.

Some examples of the method, apparatuses, and non-transitory computer-readable medium described herein may further include operations, features, means, or instructions for transmitting, to the target cell before the handover procedure may be completed, a request to relocate a context of the UE and receiving, from the target cell, a message indicating that relocation of the context of the UE may be complete.

Some examples of the method, apparatuses, and non-transitory computer-readable medium described herein may further include operations, features, means, or instructions for transmitting, in the second control message, an indication of reserved resources for the UE to use to perform contention-free random-access to connect to the target cell or to perform the handover procedure to the target cell without a random-access procedure.

In some examples of the method, apparatuses, and non-transitory computer-readable medium described herein, the triggering condition corresponds to a time and speed of the target cell, a location of the UE, a measurement report received from the UE, or a combination thereof.

Some examples of the method, apparatuses, and non-transitory computer-readable medium described herein may further include operations, features, means, or instructions for receiving, from the UE, an indication that the handover procedure failed or was not initiated.

In some examples of the method, apparatuses, and non-transitory computer-readable medium described herein, the first control message includes a set of multiple configurations of a set of multiple target cells for the UE to use to perform handover procedures to the set of multiple target cells and the method, apparatuses, and non-transitory computer-readable medium may include further operations, features, means, or instructions for transmitting an indication to release at least one of the set of multiple configurations of the set of multiple target cells.

A method for wireless communication at a target cell is described. The method may include receiving, from a source cell, a request for the target cell to validate a configuration of the target cell, transmitting an acknowledgment indicating that the configuration of the target cell is validated, and receiving an indication from a UE that a handover procedure from the source cell to the target cell is completed.

An apparatus for wireless communication at a target cell is described. The apparatus may include a processor, and memory coupled to the processor. The processor and memory may be configured to receive, from a source cell, a request for the target cell to validate a configuration of the target cell, transmit an acknowledgment indicating that the configuration of the target cell is validated, and receive an indication from a UE that a handover procedure from the source cell to the target cell is completed.

Another apparatus for wireless communication at a target cell is described. The apparatus may include means for receiving, from a source cell, a request for the target cell to validate a configuration of the target cell, means for transmitting an acknowledgment indicating that the configuration of the target cell is validated, and means for receiving an indication from a UE that a handover procedure from the source cell to the target cell is completed.

A non-transitory computer-readable medium storing code for wireless communication at a target cell is described. The code may include instructions executable by a processor to receive, from a source cell, a request for the target cell to validate a configuration of the target cell, transmit an acknowledgment indicating that the configuration of the target cell is validated, and receive an indication from a UE that a handover procedure from the source cell to the target cell is completed.

Some examples of the method, apparatuses, and non-transitory computer-readable medium described herein may further include operations, features, means, or instructions for receiving, from the source cell before the handover procedure may be completed, a request to relocate a context of the UE and transmitting, to the source cell, a message indicating that relocation of the context of the UE may be complete.

Some examples of the method, apparatuses, and non-transitory computer-readable medium described herein may further include operations, features, means, or instructions for performing a path switch with a serving gateway to indicate to the serving gateway that the context of the UE may be at the target cell.

In some examples of the method, apparatuses, and non-transitory computer-readable medium described herein, the UE, the source cell, and the target cell may be operating in an NTN.

A method for wireless communication at a UE is described. The method may include receiving, from a satellite at a first time period, a first control message including a configuration of a target cell to use at a second time period for performing a handover procedure from a source cell to the target cell, the second time period occurring after the first time period and receiving, from the satellite at the second time period, a second control message triggering the UE to perform the handover procedure from the source cell to the target cell.

An apparatus for wireless communication at a UE is described. The apparatus may include a processor, and memory coupled to the processor. The processor and memory may be configured to receive, from a satellite at a first time period, a first control message including a configuration of a target cell to use at a second time period for performing a handover procedure from a source cell to the target cell, the second time period occurring after the first time period and receive, from the satellite at the second time period, a second control message triggering the UE to perform the handover procedure from the source cell to the target cell.

Another apparatus for wireless communication at a UE is described. The apparatus may include means for receiving, from a satellite at a first time period, a first control message including a configuration of a target cell to use at a second time period for performing a handover procedure from a source cell to the target cell, the second time period occurring after the first time period and means for receiving, from the satellite at the second time period, a second control message triggering the UE to perform the handover procedure from the source cell to the target cell.

A non-transitory computer-readable medium storing code for wireless communication at a UE is described. The code may include instructions executable by a processor to receive, from a satellite at a first time period, a first control message including a configuration of a target cell to use at a second time period for performing a handover procedure from a source cell to the target cell, the second time period occurring after the first time period and receive, from the satellite at the second time period, a second control message triggering the UE to perform the handover procedure from the source cell to the target cell.

Some examples of the method, apparatuses, and non-transitory computer-readable medium described herein may further include operations, features, means, or instructions for performing the handover procedure from the source cell to the target cell using the configuration of the target cell included in the first control message in response to receiving the second control message.

In some examples of the method, apparatuses, and non-transitory computer-readable medium described herein, the handover procedure includes a conditional handover procedure after receiving the second control message.

In some examples of the method, apparatuses, and non-transitory computer-readable medium described herein, and the method, apparatuses, and non-transitory computer-readable medium may include further operations, features, means, or instructions for determining that at least one criterion for performing the conditional handover procedure may be satisfied and performing the conditional handover procedure from the source cell to the target cell using the configuration of the target cell included in the first control message in response to receiving the second control message.

In some examples of the method, apparatuses, and non-transitory computer-readable medium described herein, determining that the at least one criterion may be satisfied may include operations, features, means, or instructions for performing a measurement on the target cell and determining that the measurement may be greater than a threshold.

In some examples of the method, apparatuses, and non-transitory computer-readable medium described herein, determining that the at least one criterion may be satisfied may include operations, features, means, or instructions for determining that a measurement report for the target cell may be triggered.

In some examples of the method, apparatuses, and non-transitory computer-readable medium described herein, determining that the at least one criterion may be satisfied may include operations, features, means, or instructions for performing a measurement on the target cell and the source cell and determining that the measurement performed on the target cell may be greater than or equal to the measurement performed on the source cell.

Some examples of the method, apparatuses, and non-transitory computer-readable medium described herein may further include operations, features, means, or instructions for receiving, in the second control message, an indication of reserved resources for performing contention-free random-access to connect to the target cell or for performing the handover procedure to the target cell without a random-access procedure.

Some examples of the method, apparatuses, and non-transitory computer-readable medium described herein may further include operations, features, means, or instructions for attempting to perform the handover procedure from the source cell to the target cell using the configuration of the target cell included in the first control message in response to receiving the second control message and determining that the handover procedure from the source cell to the target cell failed.

Some examples of the method, apparatuses, and non-transitory computer-readable medium described herein may further include operations, features, means, or instructions for selecting a cell with which the UE may be to establish a connection and establishing the connection with the selected cell using the configuration of the target cell received in the first control message.

Some examples of the method, apparatuses, and non-transitory computer-readable medium described herein may further include operations, features, means, or instructions for transmitting, to the source cell, an indication that the handover procedure failed, where the indication that the handover procedure failed includes a response to the second control message or a latest measurement report.

Some examples of the method, apparatuses, and non-transitory computer-readable medium described herein may further include operations, features, means, or instructions for determining not to initiate the handover procedure from the source cell to the target cell.

Some examples of the method, apparatuses, and non-transitory computer-readable medium described herein may further include operations, features, means, or instructions for selecting a cell with which the UE may be to establish a connection and establishing the connection with the selected cell using the configuration of the target cell received in the first control message.

Some examples of the method, apparatuses, and non-transitory computer-readable medium described herein may further include operations, features, means, or instructions for transmitting, to the source cell, an indication that the handover procedure was not initiated, where the indication that the handover procedure was not initiated includes a response to the second control message or a latest measurement report.

In some examples of the method, apparatuses, and non-transitory computer-readable medium described herein, the first control message includes a set of multiple configurations of a set of multiple target cells to use for performing handover procedures to the set of multiple target cells.

Some examples of the method, apparatuses, and non-transitory computer-readable medium described herein may further include operations, features, means, or instructions for receiving an indication to release at least one of the set of multiple configurations of the set of multiple target cells and releasing the at least one of the set of multiple configurations.

In some examples of the method, apparatuses, and non-transitory computer-readable medium described herein, the second control message indicates that a context of the UE may be relocated to the target cell.

In some examples of the method, apparatuses, and non-transitory computer-readable medium described herein, the second control message indicates that a TTT timer for performing the handover procedure shall expire or may be reduced if the TTT timer may be running.

In some examples of the method, apparatuses, and non-transitory computer-readable medium described herein, the second control message includes a downlink control information message, a MAC control element, or an RRC message.

In some examples of the method, apparatuses, and non-transitory computer-readable medium described herein, the second control message may be specific to the UE or specific to a group of UEs including the UE.

In some examples of the method, apparatuses, and non-transitory computer-readable medium described herein, the UE, the source cell, and the target cell may be operating in an NTN.

A method for wireless communication at a source cell is described. The method may include transmitting a first control message to a UE including a configuration of a target cell for the UE to use to perform a handover procedure from the source cell to the target cell, the first control message being transmitted at a first time period, determining to trigger the UE to perform the handover procedure from the source cell to the target cell, and transmitting a second control message to the UE triggering the UE to perform the handover procedure from the source cell to the target cell using the configuration of the target cell based on the determining, the second control message being transmitted at a second time period, the second time period occurring after the first time period.

An apparatus for wireless communication at a source cell is described. The apparatus may include a processor, and memory coupled to the processor. The processor and memory may be configured to transmit a first control message to a UE including a configuration of a target cell for the UE to use to perform a handover procedure from the source cell to the target cell, the first control message being transmitted at a first time period, determine to trigger the UE to perform the handover procedure from the source cell to the target cell, and transmit a second control message to the UE triggering the UE to perform the handover procedure from the source cell to the target cell using the configuration of the target cell based on the determining, the second control message being transmitted at a second time period, the second time period occurring after the first time period.

Another apparatus for wireless communication at a source cell is described. The apparatus may include means for transmitting a first control message to a UE including a configuration of a target cell for the UE to use to perform a handover procedure from the source cell to the target cell, the first control message being transmitted at a first time period, means for determining to trigger the UE to perform the handover procedure from the source cell to the target cell, and means for transmitting a second control message to the UE triggering the UE to perform the handover procedure from the source cell to the target cell using the configuration of the target cell based on the determining, the second control message being transmitted at a second time period, the second time period occurring after the first time period.

A non-transitory computer-readable medium storing code for wireless communication at a source cell is described. The code may include instructions executable by a processor to transmit a first control message to a UE including a configuration of a target cell for the UE to use to perform a handover procedure from the source cell to the target cell, the first control message being transmitted at a first time period, determine to trigger the UE to perform the handover procedure from the source cell to the target cell, and transmit a second control message to the UE triggering the UE to perform the handover procedure from the source cell to the target cell using the configuration of the target cell based on the determining, the second control message being transmitted at a second time period, the second time period occurring after the first time period.

Some examples of the method, apparatuses, and non-transitory computer-readable medium described herein may further include operations, features, means, or instructions for transmitting, to the target cell, a request for the target cell to validate the configuration of the target cell included in the first control message.

Some examples of the method, apparatuses, and non-transitory computer-readable medium described herein may further include operations, features, means, or instructions for receiving, from the target cell, an acknowledgment that the configuration of the target cell may be validated, where transmitting the second control message may be based on receiving the acknowledgment.

Some examples of the method, apparatuses, and non-transitory computer-readable medium described herein may further include operations, features, means, or instructions for transmitting, to the target cell before the handover procedure may be completed, a request to relocate a context of the UE and receiving, from the target cell, a message indicating that relocation of the context of the UE may be complete.

Some examples of the method, apparatuses, and non-transitory computer-readable medium described herein may further include operations, features, means, or instructions for transmitting, in the second control message, an indication of reserved resources for the UE to use to perform contention-free random-access to connect to the target cell or to perform the handover procedure to the target cell without a random-access procedure.

Some examples of the method, apparatuses, and non-transitory computer-readable medium described herein may further include operations, features, means, or instructions for determining to trigger the UE to perform the handover procedure from the source cell to the target cell may be based on a time and speed of the target cell, a location of the UE, a measurement report received from the UE, or a combination thereof.

Some examples of the method, apparatuses, and non-transitory computer-readable medium described herein may further include operations, features, means, or instructions for receiving, from the UE, an indication that the handover procedure failed or was not initiated.

In some examples of the method, apparatuses, and non-transitory computer-readable medium described herein, the indication that the handover procedure failed or was not initiated includes a response to the second control message or a latest measurement report.

In some examples of the method, apparatuses, and non-transitory computer-readable medium described herein, the first control message includes a set of multiple configurations of a set of multiple target cells for the UE to use to perform handover procedures to the set of multiple target cells.

Some examples of the method, apparatuses, and non-transitory computer-readable medium described herein may further include operations, features, means, or instructions for transmitting an indication to release at least one of the set of multiple configurations of the set of multiple target cells.

In some examples of the method, apparatuses, and non-transitory computer-readable medium described herein, the second control message indicates that a context of the UE may be relocated to the target cell.

In some examples of the method, apparatuses, and non-transitory computer-readable medium described herein, the second control message indicates that a TTT timer at the UE for performing the handover procedure shall expire or may be reduced if the TTT timer may be running.

In some examples of the method, apparatuses, and non-transitory computer-readable medium described herein, the second control message includes a downlink control information message, a MAC control element, or an RRC message.

In some examples of the method, apparatuses, and non-transitory computer-readable medium described herein, the second control message may be specific to the UE or specific to a group of UEs including the UE.

In some examples of the method, apparatuses, and non-transitory computer-readable medium described herein, the UE, the source cell, and the target cell may be operating in an NTN.

A method for wireless communication at a target cell is described. The method may include receiving, from a source cell, a request for the target cell to validate a configuration of the target cell, the configuration being stored at a UE, transmitting an acknowledgment indicating that the configuration of the target cell is validated, and receiving an indication from the UE that a handover procedure from the source cell to the target cell is completed.

An apparatus for wireless communication at a target cell is described. The apparatus may include a processor, and memory coupled to the processor. The processor and memory may be configured to receive, from a source cell, a request for the target cell to validate a configuration of the target cell, the configuration being stored at a UE, transmit an acknowledgment indicating that the configuration of the target cell is validated, and receive an indication from the UE that a handover procedure from the source cell to the target cell is completed.

Another apparatus for wireless communication at a target cell is described. The apparatus may include means for receiving, from a source cell, a request for the target cell to validate a configuration of the target cell, the configuration being stored at a UE, means for transmitting an acknowledgment indicating that the configuration of the target cell is validated, and means for receiving an indication from the UE that a handover procedure from the source cell to the target cell is completed.

A non-transitory computer-readable medium storing code for wireless communication at a target cell is described. The code may include instructions executable by a processor to receive, from a source cell, a request for the target cell to validate a configuration of the target cell, the configuration being stored at a UE, transmit an acknowledgment indicating that the configuration of the target cell is validated, and receive an indication from the UE that a handover procedure from the source cell to the target cell is completed.

Some examples of the method, apparatuses, and non-transitory computer-readable medium described herein may further include operations, features, means, or instructions for receiving, from the source cell before the handover procedure may be completed, a request to relocate a context of the UE and transmitting, to the source cell, a message indicating that relocation of the context of the UE may be complete.

Some examples of the method, apparatuses, and non-transitory computer-readable medium described herein may further include operations, features, means, or instructions for performing a path switch with a serving gateway to indicate to the serving gateway that the context of the UE may be at the target cell.

In some examples of the method, apparatuses, and non-transitory computer-readable medium described herein, the UE, the source cell, and the target cell may be operating in an NTN.

DETAILED DESCRIPTION

Some wireless communications systems may support communications between a UE and one or more satellites in an NTN. In such systems, the satellites may be constantly moving, and the cells or coverage areas supported by these satellites may also be moving. Due to the movement of the cells, a UE may see a frequent change in a serving cell (e.g., physical cell identifier (PCI)), even when the UE is stationary. That is, the UE may perform frequent handovers to different cells to maintain a connection with the NTN. As part of a handover procedure, a UE or source cell may select a target cell for the handover procedure, and the source cell may signal a configuration of the target cell to the UE. The UE may then use the configuration of the target cell to perform a handover to the target cell. In some cases, however, the overhead and latency associated with selecting a target cell and signaling the configuration of the target cell (e.g., dynamically or on the fly) may be high, and the overhead and latency may be compounded if the UE is expected to perform frequent handovers (e.g., in an NTN).

As described herein, a wireless communications system may support efficient techniques for facilitating a handover at a UE from a source cell to a target cell. In particular, a source cell may transmit a handover command to a UE indicating the configuration of a target cell in advance of a handover to the target cell. Then, at the time of the handover, the source cell may transmit a handover indication to the UE to trigger the handover to the target cell using the configuration of the target cell included in the handover command. That is, the UE may use the configuration of the target cell received in the handover command to perform a handover procedure from the source cell to the target cell in response to receiving the handover indication. Because the UE may receive the configuration of the target cell in advance of a trigger to perform a handover to the target cell, the overhead of the trigger and the latency associated with processing the trigger may be low, and the frequent handovers performed by the UE may be more efficient.

Aspects of the disclosure introduced above are described below in the context of a wireless communications system. Examples of processes and signaling exchanges that support network triggered handover are then described. Aspects of the disclosure are further illustrated by and described with reference to apparatus diagrams, system diagrams, and flowcharts that relate to network triggered handover.

Figure 1:
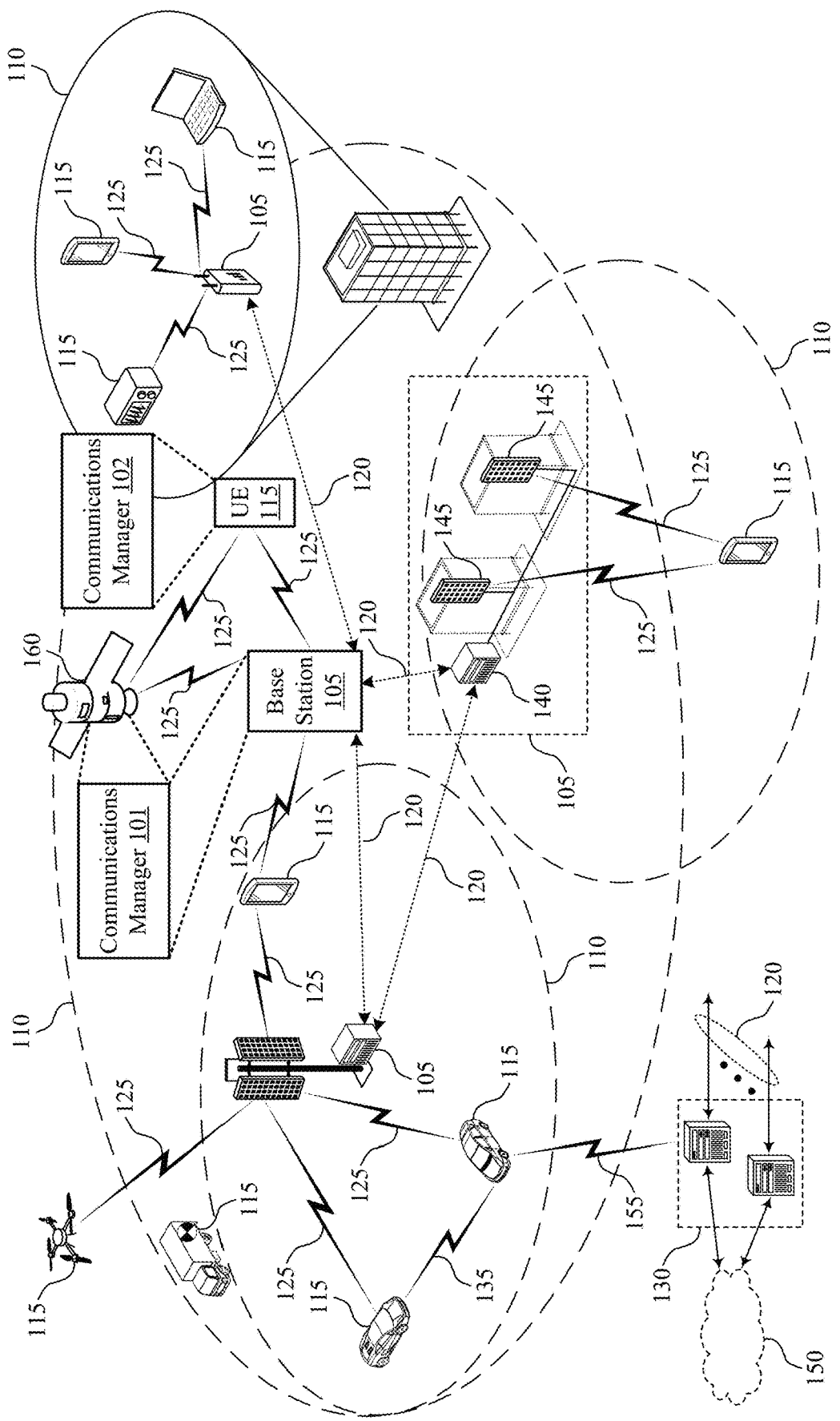
FIG. 1 illustrates an example of a system for wireless communications that supports network triggered handover in accordance with one or more aspects of the present disclosure.

FIG. 1 illustrates an example of a wireless communications system 100 that supports network triggered handover in accordance with one or more aspects of the present disclosure. The wireless communications system 100 may include one or more base stations 105, one or more UEs 115, and a core network 130. In some examples, the wireless communications system 100 may include an LTE network, an LTE-A network, an LTE-A Pro network, an NR network, or an NTN. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

An NTN in wireless communications system 100 may utilize one or more satellites 160. In some implementations, a satellite 160 may broadly refer to a high-altitude platform such as an extra-atmospheric orbiting satellite or an intra-atmosphere satellite including, for example, a high-altitude balloon or aircraft. The satellites 160 may relay communications between base stations 105 and UEs 115. In some examples, the satellites 160 may include aspects of base stations 105 or may perform functions ascribed herein to base stations 105. Each satellite 160 may be associated with a geographic coverage area 145 in which communications with various UEs 115 are supported. For instance, each satellite may provide communication coverage for a respective geographic coverage area 110 via communication links 125, and communication links 125 between a satellite 160 and a UE 115 may utilize one or more carriers.

In an NTN network, communication links 125 shown in wireless communications system 100 may include upstream transmissions from a UE 115 to a network node (for example, to a satellite 160 or to a base station 105 via a satellite 160), or downstream transmissions to a UE 115 from a network node (for example, from a satellite 160 or from a base station 105 via a satellite 160). In some implementations, transmissions from the ground (for example, from a UE 115 or base station 105) to a satellite 160 may be referred to as uplink transmissions, and transmissions from a satellite 160 to the ground (for example, to a UE 115 or base station 105) may be referred to as downlink transmissions. Thus, depending on whether a gateway (for example, a base station 105) may be collocated with (for example, included in) a satellite 160 or at the ground, either upstream or downstream transmissions may include a mix of uplink and downlink transmissions. Downstream transmissions may also be called forward link transmissions while upstream transmissions may also be called reverse link transmissions. In some implementations, a geographic coverage area 110 of a satellite 160 may be an area associated with a transmission beam of the satellite 160 and may be referred to as a beam footprint.

The geographic coverage area 110 for a base station 105 or a satellite 160 may be divided into sectors making up a portion of the geographic coverage area, and each sector may be associated with a cell. For example, each base station 105 or satellite 160 may provide communication coverage for a macro cell, a small cell, a hot spot, or other types of cells, or various combinations thereof. In some examples, a base station 105 or a satellite 160 may be movable and therefore provide communication coverage for a moving geographic coverage area 110. In some examples, different geographic coverage areas associated with different technologies may overlap, and overlapping geographic coverage areas associated with different technologies may be supported by the same base station 105 or by different base stations 105. The wireless communications system 100 may include, for example, a heterogeneous LTE/LTE-A/LTE-A Pro network, an NR network, or an NTN network in which different types of base stations 105 or satellites 140 provide coverage for various geographic coverage areas.

The term "cell" may refer to a logical communication entity used for communication with a base station 105 or satellite 160 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system, a UE 115 may support handovers from one cell to another cell to maintain a high-quality connection with a network. In some cases, the a handover procedure may be triggered if one or more conditions are satisfied. In particular, the UE 115 may perform measurements (e.g., reference signal received power (RSRP) measurements, reference signal received quality (RSRQ) measurements, or signal-to-interference-plus-noise ratio (SINR) measurements) on one or more cells, and if the measurements satisfy one or more conditions for a cell, the UE 115 may perform a handover to the cell. As an example, the UE 115 may perform a handover to a target cell if one or more events are triggered. In some cases, an event may be triggered if the conditions associated with the event are satisfied at the UE 115 for a preconfigured duration of time (e.g., until a TTT timer expires).

In one example, an event A1 may be triggered when measurements performed on a source or serving cell satisfy a threshold. In another example, an event A2 may be triggered when measurements performed on a source or serving cell falls below a threshold. In yet another example, an event A3 may be triggered when measurements performed on a neighboring cell (e.g., target cell) are better (e.g., higher RSRP, RSRQ, or SINR) than the same measurements performed on a source or serving cell by an offset (e.g., negative or positive offset). In yet another example, an event A4 may be triggered when measurements performed on a neighboring cell satisfy a threshold. In yet another example, an event A5 may be triggered when measurements performed on the source or serving cell falls below a first threshold while measurements performed on a neighboring cell satisfy a second threshold.

A source cell at a base station 105 or a satellite 160 may include a communications manager 101. The communications manager 101 at the source cell may transmit a first control message to a UE comprising a configuration of a target cell for the UE to use to perform a handover procedure from the source cell to the target cell, the first control message being transmitted at a first time period. The communications manager 101 may then determine to trigger the UE to perform the handover procedure from the source cell to the target cell and transmit a second control message to the UE triggering the UE to perform the handover procedure from the source cell to the target cell using the configuration of the target cell based at least in part on the determining, the second control message being transmitted at a second time period, the second time period occurring after the first time period.

A target cell at a base station 105 or a satellite 160 may also include a communications manager 101. The communications manager 101 at the target cell may receive, from a source cell, a request for the target cell to validate a configuration of the target cell stored at a UE and transmit an acknowledgment indicating that the configuration of the target cell is validated. The communications manager 101 may then receive an indication from the UE that a handover procedure from the source cell to the target cell is completed.

A UE 115 may include a communications manager 102. The communications manager 102 may receive, from a satellite at a first time period, a first control message comprising a configuration of a target cell to use at a second time period for performing a handover procedure from a source cell to the target cell, the second time period occurring after the first time period. Communications manager 102 may receive, from the satellite at the second time period, a second control message triggering the UE to perform the handover procedure from the source cell to the target cell. Communications manager 102 may then perform performing the handover procedure from the source cell to the target cell using the configuration of the target cell included in the first control message in response to receiving the second control message.

Figure 2:
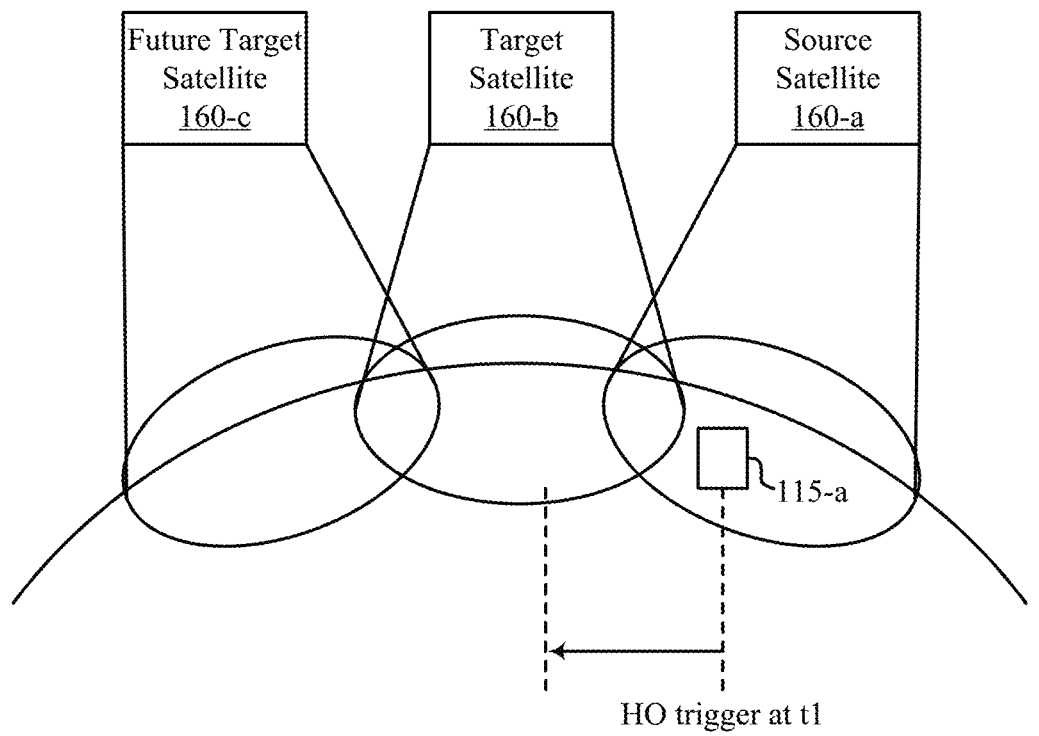
FIG. 2 illustrates an example of an NTN that supports network triggered handover in accordance with one or more aspects of the present disclosure.

FIG. 2 illustrates an example of an NTN 200 that supports network triggered handover in accordance with one or more aspects of the present disclosure. Although the NTN 200 depicts source and target satellites, it is to be understood that the source and target satellites may represent source and target cells at one or more satellites 160. In the example of FIG. 2, a UE 115-*a* may communicate with a source satellite 160-*a*. Due to the movement of the source satellite 160-*a*, however, it may be appropriate for the UE 115-*a* to perform a handover to the target satellite 160-*b*. Similarly, after performing the handover to the target satellite 160-*c*, it may be appropriate for the UE 115-*a* to perform another handover to the future target satellite 160-*b* at a later time.

Because the speed of the source satellite 160-a and the size of the coverage area (e.g., cell) of the source satellite 160-a may be known, the NTN may be able to identify an appropriate time t1 for the UE 115-a to perform the handover to the target satellite 160-b. For instance, considering a 100 km cell diameter and a satellite speed of 7.56 km/h, it may be appropriate for the UE 115-a to be handed over to a new cell every 13.2 seconds.

Thus, the NTN may know the exact time (e.g., t1 in the future) for the UE 115-a to be handed over to a next cell (e.g., on the predictable path of the UE 115-a). Because the NTN may be able to identify a time for the UE 115-a to perform a handover to a next cell well in advance of the handover, it may be unnecessary for the NTN to dynamically indicate a configuration to the UE 115-a for performing the handover (e.g., immediately before the handover). Further, the overhead and latency associated with signaling and processing measurement reports and configurations for the UE 115-a to perform handovers may be high, and the overhead and latency may be compounded if the UE is expected to perform frequent handovers (e.g., in an NTN). For instance, there may be multiple UEs 115 in a similar position as the UE 115-a, and it may also be appropriate for these UEs 115 to perform frequent handovers. The techniques described herein may limit overhead and latency in an NTN and may allow the UE 115-a to perform handovers more efficiently.

Figure 3:
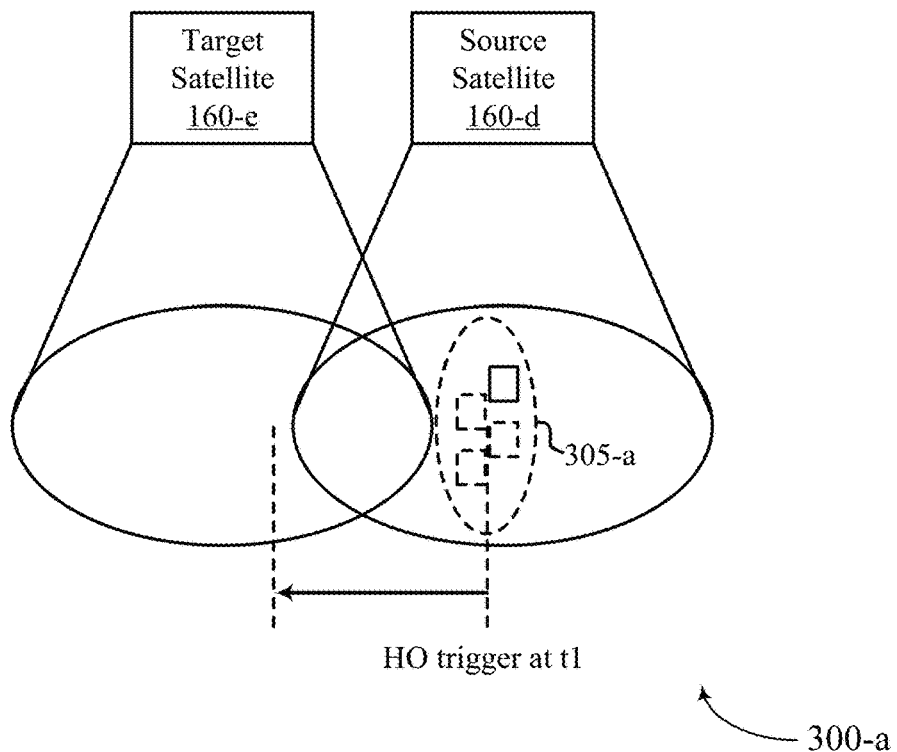
FIG. 3 illustrates an example of an NTN that supports network triggered handover in accordance with one or more aspects of the present disclosure.
Figure 3:
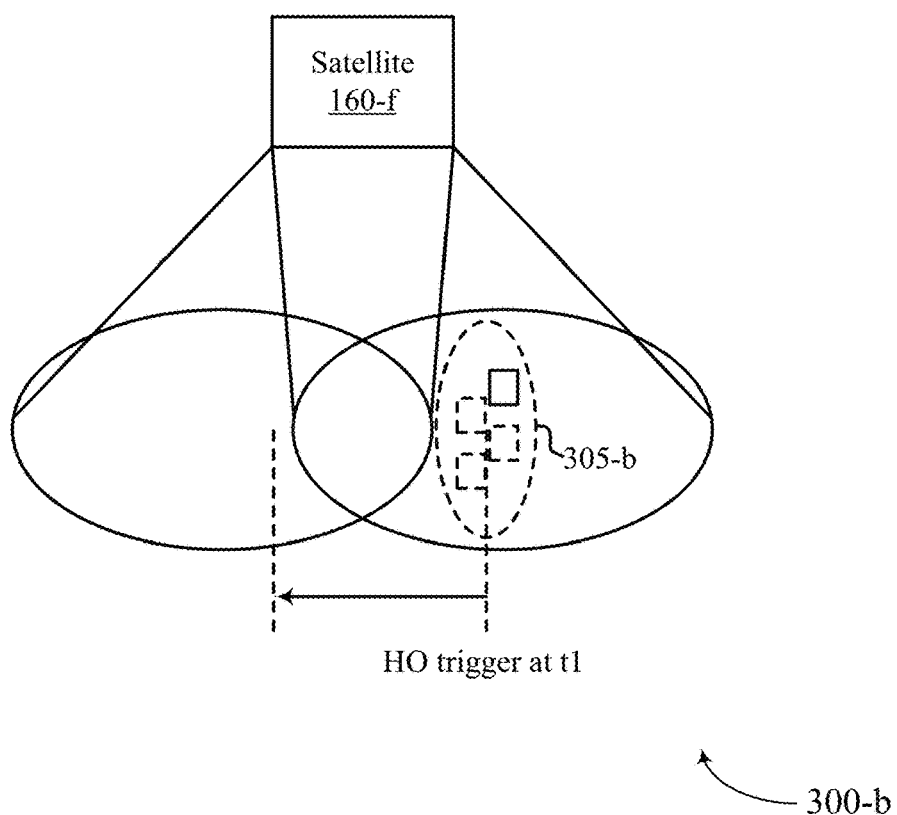

FIG. 3 illustrates examples of NTNs 300 that support network triggered handover in accordance with one or more aspects of the present disclosure. As described herein, if an NTN 300 identifies a current location of a UE 115 in the group of UEs 305 (e.g., when the UE 115 is in an RRC connected mode), the NTN 300 may also be able to identify a next cell to provide coverage to the UE 115. As described herein, the NTN 300 may transmit a control message to the UE 115 including a configuration of a target cell. The control message including the configuration of the target cell may be referred to as a conditional handover command if the control message specifies at least one condition or criterion to be satisfied before the UE 115 performs a handover. Otherwise, the control message may be referred to as a handover command.

In some cases, the NTN 300 may indicate multiple handover or conditional handover commands to the UE 115 each including a configuration for performing a handover to a different future target cell at a different time in the future (e.g., handover to a first satellite at a first time and a second satellite at a second time, where the second time is indicated independently or as a delta of the first time). Then, at an appropriate time in the future (e.g., t1 in FIG. 3), the NTN 300 (e.g., the current source cell serving the UE 115) may trigger a handover at the UE 115 from a source cell to a target cell. Further, the NTN 300 may trigger a handover for all UEs 115 that have not executed a previously received handover or conditional handover command. As an example, a source cell for the UE 115 may transmit an indication to the UE 115 triggering the UE 115 to perform a handover from the source cell to a target cell if the UE 115 already has a stored handover command or conditional handover command for the target cell.

In some examples, if the source cell triggers a conditional handover procedure at the UE 115, a simple condition may be defined to override the previously configured conditional handover execution condition. For example, the UE 115 may be triggered to perform a handover to a target cell using a previously received configuration of the target cell if the measurements related to the target cell are within an offset as compared to measurements related to the source cell. Additionally, or alternatively, the conditional handover may be executed if the UE 115 determines that at least one condition (e.g., entering condition) is satisfied. For instance, the conditional handover may be executed if an event A3 is triggered with an offset of zero, regardless of other configured conditions (e.g., RSRQ or SINR measurements) and regardless of an event A5 and whether a TTT timer is running.

In a first example, the NTN 300-a may include a source satellite 160-d and a target satellite 160-e. The source satellite 160-d may represent a source cell at the source satellite 160-d, and the target satellite 160-d may represent a target cell at the target satellite 160-e. Once a UE 115 in the group of UEs 305-a receives a trigger to perform a handover procedure from the source satellite 160-d to the target satellite 160-e, the UE 115 may use a configuration received from the NTN 300-a (e.g., from the source satellite 160-d or a previous source satellite 160) to perform the handover to the target satellite 160-e. In a second example, the NTN 300-b may include a satellite 160-f which may include a source cell at the satellite 160-f and a target cell at the satellite 160-f. Similarly, once a UE 115 in the group of UEs 305-b receives a trigger to perform a handover procedure from a source cell at the satellite 160-f to a target cell at the satellite 160-f, the UE 115 may use a configured received from the NTN 300-b (e.g., from the source cell at the satellite 160-f or a previous source cell at the satellite 160-f) to perform the handover to the target cell at the satellite 160-f.

Figure 4:
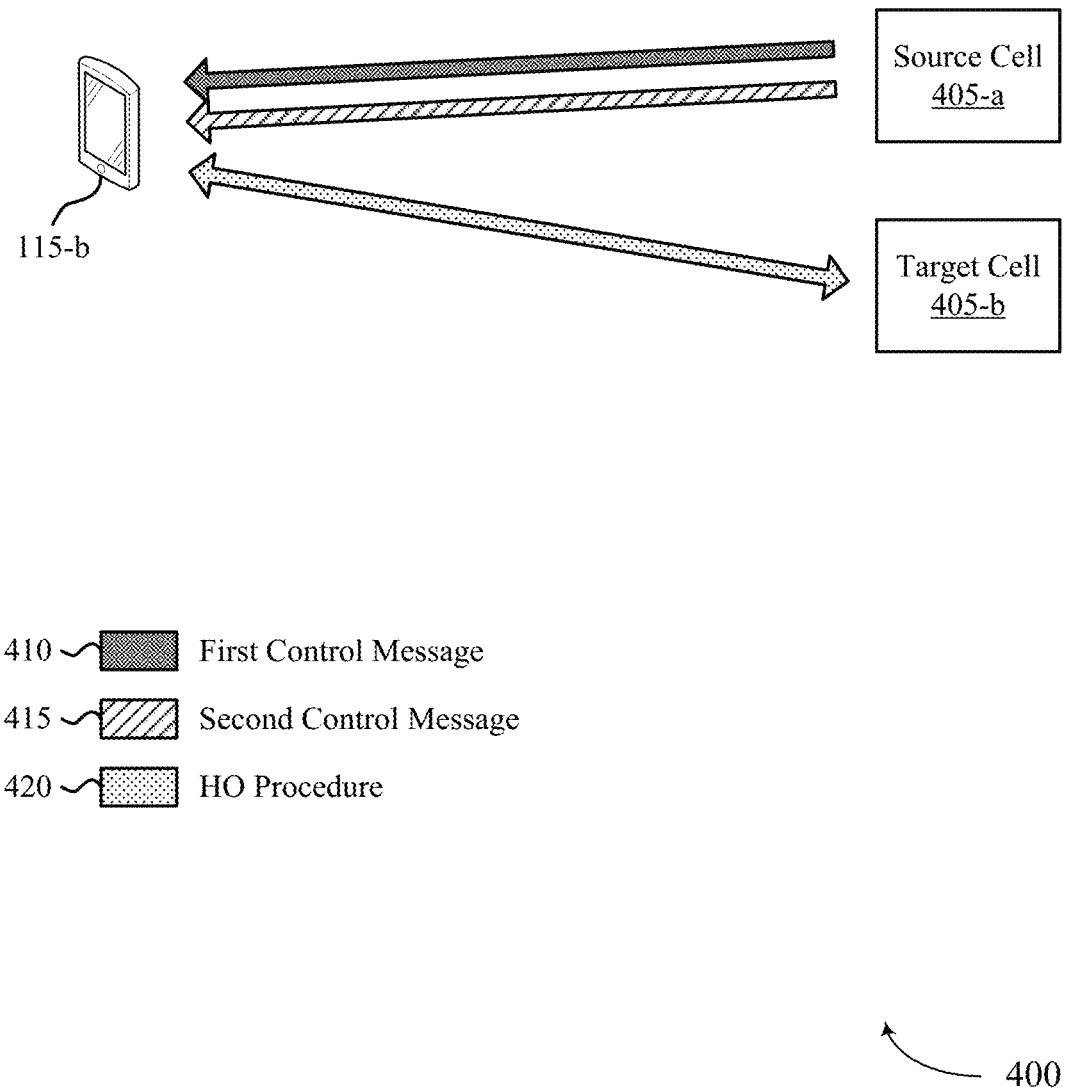
FIG. 4 illustrates an example of a wireless communications system that supports network triggered handover in accordance with one or more aspects of the present disclosure.

FIG. 4 illustrates an example of a wireless communications system 400 that supports network triggered handover in accordance with one or more aspects of the present disclosure. The wireless communications system 400 may include an NTN as described herein. The wireless communications system 400 includes a UE 115-b, which may be an example of a UE 115 described with reference to FIGS. 1-3. The wireless communications system 400 also includes a source cell 405-a and a target cell 405-b which may be examples of a source cell and target cell described with reference to FIGS. 1-3. The source cell may be at a source satellite 160, and the target cell may be at a target satellite 160. Alternatively, the source cell and the target cell may be at the same satellite 160. The wireless communications system 400 may implement aspects of wireless communications system 100. For example, the wireless communications system 400 may support efficient techniques for facilitating a handover at the UE 115-b from the source cell 405 to the target cell 410.

In the example of FIG. 4, the UE 115-b may receive a first control message (e.g., handover command or conditional handover command) from the source cell 405-a indicating a configuration of the target cell 405-b to use to perform a handover procedure from the source cell 405-a to the target cell 405-b. The UE 115-b may receive the first control message 410 as soon as the UE 115-b moves into an RRC connected state. Further, the UE 115-b may receive the handover command at a first time period and store the configuration of the target cell 405-b until a handover to the target cell 405-b is triggered at a second (e.g., later) time period. The UE 115-b may then receive a second control message 415, at the second (e.g., later) time period, triggering the UE 115-b to perform the handover from the source cell 405-a to the target cell 405-b at the second (e.g., later) time period. Upon receiving the second control message 415, the UE 115-b may perform the handover procedure 420 from the source cell 405-a to the target cell 405-b.

If the first control message includes a conditional handover command, the UE 115-*b* may evaluate one or more conditions or criteria indicated by the conditional handover command. If the one or more conditions or criteria are satisfied, the UE 115-*b* may execute the handover procedure 420 from the source cell 405-*a* to the target cell 405-*b*. Alternatively, if the first control message includes a handover command or a conditional handover command indicating a forced handover, the UE 115-*b* may execute the handover procedure 420 from the source cell 405-*a* to the target cell 405-*b* (e.g., without evaluating any conditions or criteria). In some cases, the UE 115-*b* may receive the handover command for the target cell 405-*b* (e.g., the configuration of the target cell 405-*b* in the first control message 410) and the handover command for other target cells (e.g., configurations of future target cells). In such cases, after successfully performing the handover procedure 420 to the target cell 405-*b*, the UE 115-*b* may keep the stored handover commands (e.g., configurations of future target cells) that were not executed. The UE 115-*b* may then execute each of these handover commands to handover to a future target cell at an appropriate time in the future. Alternatively, the NTN may send an indication to the UE 115-*b* (e.g., via a current source cell of the UE 115-*b*) to selectively release one or more handover commands if the handover commands will no longer be valid or the NTN decides to update the handover commands.

In some cases, if the first control message is a conditional handover command, the conditional handover command may also be configured with an event A4. That is, the UE 115-*b* may execute the handover procedure 420 from the source cell 405-*a* to the target cell 405-*b* once the UE 115-*b* receives the second control message 415 and the UE 115-*b* determines that the target cell 405-*b* (e.g., measurements on the target cell 405-*b*) is better than a threshold. In other cases, if the first control message is a conditional handover command, the UE 115-*b* may execute the handover procedure 420 from the source cell 405-*a* to the target cell 405-*b* once the UE 115-*b* receives the second control message 415 and the UE 115-*b* determines that a measurement report for the target cell 405-*b* is triggered. In yet other cases, the first control message may be a forced handover command, and the UE 115-*b* may execute the handover procedure 420 from the source cell 405-*a* to the target cell 405-*b* once the UE 115-*b* receives the second control message 415 (e.g., without any other conditions or criteria being satisfied).

The second control message 415 triggering the UE 115-*b* to perform the handover procedure 420 may be referred to as an indication for the UE 115-*b* to execute the handover procedure 420. That is, the indication may be sent for the UE 115-*b* to execute the handover procedure 420 from the source cell 405-*a* to the target cell 405-*b* using a stored configuration for the target cell 405-*b* (e.g., the configuration received in the first control message 410). The source cell 405-*a* may determine to trigger the handover by the UE 115-*b* to the target cell 405-*b* based on a location of the UE 115-*b* (e.g., whether the UE 115-*b* crossed a border), a measurement report received from the UE 115-*b*, uplink sounding reference signals (SRSs) received from the UE 115-*b*, a channel quality report received from the UE 115-*b*, or satellite beam positions (e.g., the speed and trajectory of the one or more satellites supporting the source cell 405-*a* and the target cell 405-*b*).

The source cell 405-*a* may transmit the second control message 415 (e.g., the indication to execute the handover procedure 420) in downlink control information (DCI), a MAC control element (MAC-CE), or an RRC message.

Further, the second control message 415 may be UE-specific (e.g., specific to the UE 115-*b* and triggering the UE 115-*b* to perform the handover procedure 420) or group-specific (e.g., specific to a group of UEs 115 including the UE 115-*b* and triggering the group of UEs 115 to perform handover procedures). A UE-specific indication to perform a handover procedure may be a forced handover command, whereas a group-specific indication to perform handover procedures may be a conditional handover command (e.g., the UEs 115 in the group may execute a handover procedure when target cells become better than source cells for the UEs 115 by a negative offset). Alternatively, the UE-specific indication may be a conditional handover command, and the group-specific indication may be a forced handover command.

In some cases, the second control message 415 may also provide reserved resources for the UE 115-*b* to connect to the target cell 405-*b* (e.g., resources not reserved by the first control message 410 or the handover command). For example, the resources may be reserved for the UE 115-*b* to perform a contention-free random-access (CFRA) procedure or a handover procedure without a random-access channel (RACH) (e.g., a RACH-less handover procedure). If the UE 115-*b* is unable to execute a stored handover command (e.g., received in the first control message 410), the UE 115-*b* may report to the NTN (e.g., via the source cell 405-*a*) that the UE 115-*b* is unable to execute the stored handover command. For instance, the UE 115-*b* may transmit a response to the second control message 415 or a latest measurement report (e.g., for the target cell 405-*b*) indicating that the UE 115-*b* is unable to execute the stored handover command (e.g., the handover procedure 420 failed or was not initiated).

In some aspects, the second control message 415 used to trigger the handover procedure 420 may provide assistance information to the UE 115-*b* by indicating the time and location for the UE 115-*b* to perform the handover procedure 420 or to start evaluating conditions or criteria for executing the handover procedure 420. As an example, the second control message 415 may trigger the handover procedure 420 for the UE 115-*b* when the NTN determines the position of the UE 115-*b* (e.g., if the UE 115-*b* fails to support a global navigation satellite system (GNSS) capability to determine its own position). In this example, a different condition (e.g., relaxed or refined condition) may be defined to override a preconfigured condition for executing the handover procedure 420. The different condition may be different from an RSRP since the RSRP may not change much due to a long propagation delay in an NTN. In other aspects, the second control message 415 may indicate to the UE 115-*b* that the context of the UE 115-*b* (e.g., UE context) will be relocated to a different satellite (e.g., a satellite supporting the target cell 405-*b* in the case of inter-satellite handover) regardless of the handover result. In some cases, the UE context may include protocol data unit (PDU) session context information, security key information, UE radio capability information, UE security capabilities information, etc.). The target cell 405-*b* may also activate the reserved resources for the handover procedure 420 for the UE 115-*b*. In yet other aspects, the second control message 415 may indicate that a TTT is expired if a TTT timer is running, or the second control message 415 may indicate that the TTT is to be considered to have a shorter length. In yet other aspects, the second control message 415 may indicate that resources reserved for the target cell 405-*b* and/or one ore more other target cells (e.g., multiple target cells in a configuration) are activated. In yet other aspects, the second control message 415 may provide an indication of a new resource for performing synchronization to the target cell 405-*b* and/or one ore more other target cells.

Because the source cell 405-*a* may transmit the second control message 415 to trigger the handover procedure 420 and avoid including a handover command in the second control message, the latency at the UE 115-*b* associated with processing the second control message 415 may be minimized. Further, the more expensive, dynamic bits used to transmit the second control message 415 may also be saved and used for other purposes. In addition, if multiple handover commands for one or more UEs 115 are included in the first control message 410, the overhead associated with signaling the handover commands to the UEs 115 may be reduced. Thus, using the techniques described herein, the process of signaling handover commands and performing handover procedures in an NTN may be more efficient.

Figure 5:
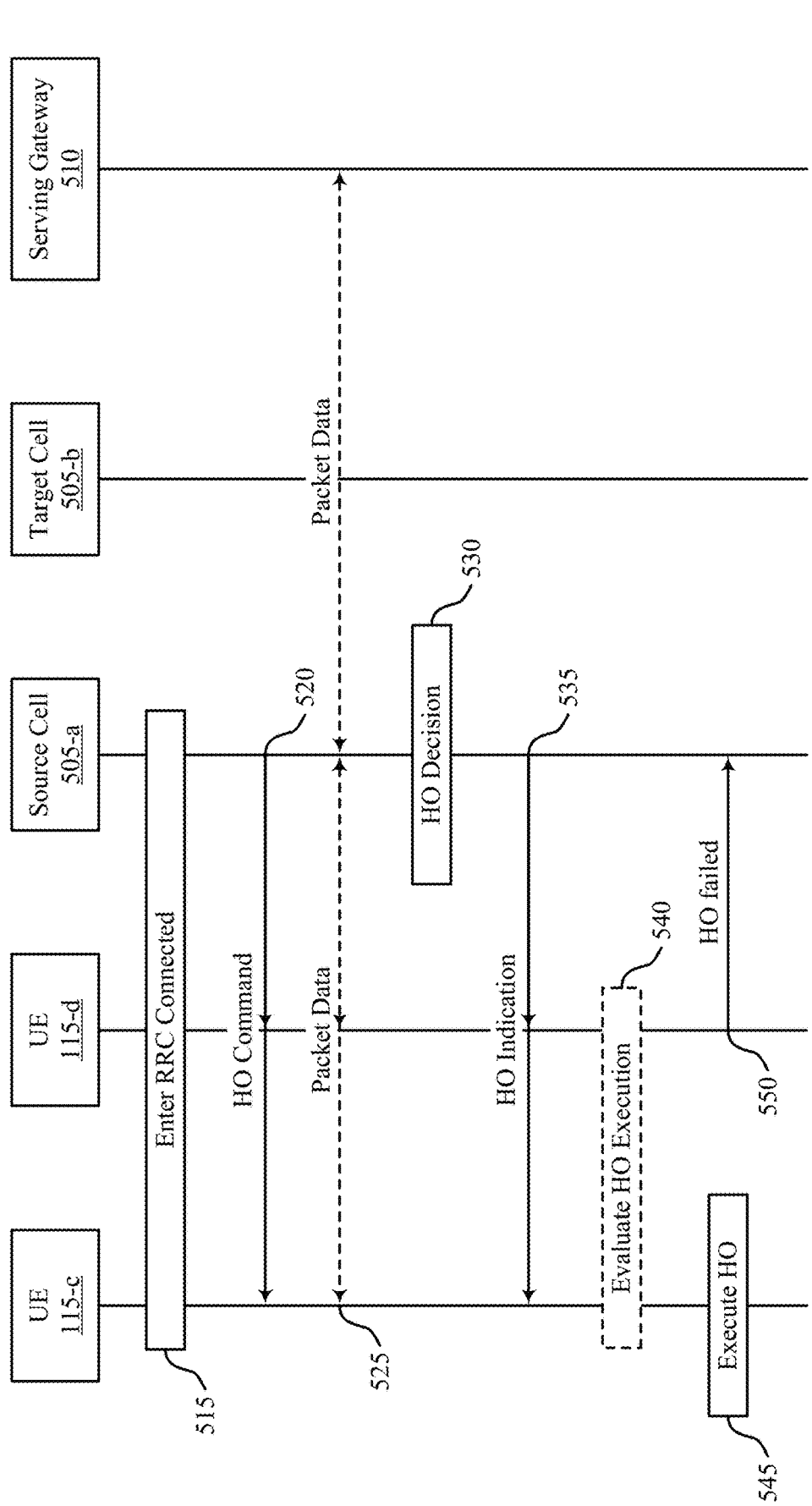
FIG. 5 illustrates an example of a process flow that supports network triggered handover in accordance with one or more aspects of the present disclosure.

FIG. 5 illustrates an example of a process flow 500 that supports network triggered handover in accordance with one or more aspects of the present disclosure. Process flow 500 illustrates aspects of techniques performed by a UE 115-*c* and a UE 115-*d*, which may be examples of a UE 115 described with reference to FIGS. 1-4. Process flow 500 also illustrates aspects of techniques performed by a source cell 505-*a* and a target cell 505-*b*, which may be examples of a source cell and target cell described with reference to FIGS. 1-4. Process flow 500 also illustrates aspects of techniques performed by a serving gateway 510, which may be an example of a serving gateway described with reference to FIG. 1. Process flow 400 may implement aspects of wireless communications system 400. For example, the process flow 500 may support efficient techniques for facilitating a handover at a UE 115 from a source cell to a target cell.

At 515, the UE 115-*c* and the UE 115-*d* may communicate with the source cell 505-*a* to enter an RRC connected mode (e.g., establish an RRC connection with the source cell 505-*a*). Upon entering the RRC connected mode, at 520, the UE 115-*c* and the UE 115-*d* may receive a handover command from the source cell 505-*a* indicating a configuration of the target cell 505-*b*. The UE 115-*c* and the UE 115-*d* may store the configuration of the target cell 505-*b* to use at a later time to perform a handover to the target cell 505-*b*. At 525, the UE 115-*c* and the UE 115-*d* may exchange packet data (e.g., communicate) with the source cell 505-*a*. The source cell may also communicate with the serving gateway 510 to identify data to transmit to the UE 115-*c* and the UE 115-*d*, and the source cell 505-*a* may communicate with the serving gateway 510 to process data received from the UE 115-*c* and the UE 115-*d*.

At 530, the source cell 505-*a* may determine to trigger the UE 115-*c* and the UE 115-*d* to perform a handover from the source cell 505-*a* to the target cell 505-*b* using the configuration of the target cell 505-*b* received in the handover command. Thus, at 535, the source cell 505-*a* may transmit a handover indication to the UE 115-*c* and the UE 115-*d* triggering the UE 115-*c* and the UE 115-*d* to perform the handover to the target cell 505-*b*. The handover indication may activate (e.g., validate) an uplink resource for the UE 115-*d* to use to connect to the target cell 505-*b* (e.g., configured CFRA resource). At 540, if the handover command indicating the configuration of the target cell 505-*b* is a conditional handover command, the UE 115-*c* and the UE 115-*d* may evaluate one or more criteria before performing the handover to the target cell 505-*b*.

In some cases, a relaxed execution condition may be defined for the conditional handover command. For instance, all UEs 115 currently meeting an entering condition may execute the conditional handover without a TTT timer expiring. Additionally, or alternatively, a new execution condition may be defined for handovers triggered with a handover indication (e.g., event A3 with a zero offset or negative offset and a TTT of zero). The execution condition may be preconfigured per UE 115 or may be common for multiple UEs 115. Further, the execution condition may override an execution condition associated with the conditional handover command. In some examples, the UE 115-*c* and the UE 115-*d* may perform the conditional handover if a measurement performed on the target cell 505-*b* is greater than a threshold, a measurement report is triggered, or a measurement performed on the target cell 505-*b* is greater than the same measurement performed on the source cell 505-*a*.

If the UE 115-*c* and the UE 115-*d* determines that the criteria in the conditional handover command is satisfied, or if the handover command fails to indicate conditions for a handover (e.g., the handover command is a forced handover command), the UE 115-*c* and the UE 115-*d* may initiate handover procedures to the target cell 505-*b*. In particular, at 545, the UE 115-*c* may execute the handover from the source cell 505-*a* to the target cell 505-*b* using the configuration of the target cell 505-*b* included in the handover command in response to receiving the handover indication triggering the handover. At 550, the UE 115-*d* may determine that the handover procedure from the source cell 505-*a* to the target cell 505-*b* failed or was not initiated. Thus, the UE 115-*d* may transmit an indication to the source cell 505-*a* that the handover procedure failed or was not initiated. For example, the UE 115-*d* may transmit a response to the handover indication or a latest measurement report to indicate that the handover procedure failed or was not initiated.

Figure 6:
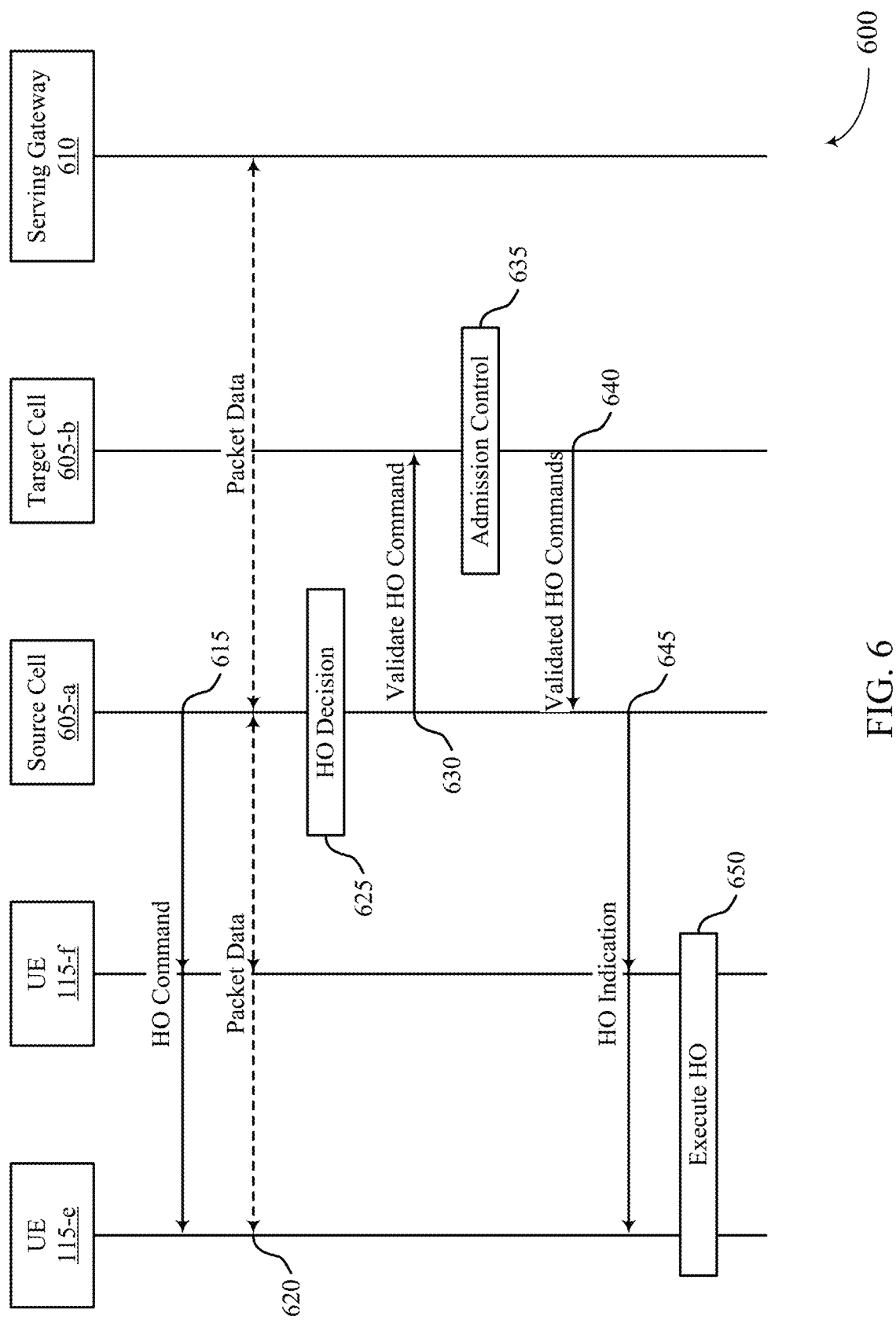
FIG. 6 illustrates an example of a process flow that supports network triggered handover in accordance with one or more aspects of the present disclosure.

FIG. 6 illustrates an example of a process flow 600 that supports network triggered handover in accordance with one or more aspects of the present disclosure. Process flow 600 illustrates aspects of techniques performed by a UE 115-*e* and a UE 115-*f*, which may be examples of a UE 115 described with reference to FIGS. 1-5. Process flow 600 also illustrates aspects of techniques performed by a source cell 605-*a* and a target cell 605-*b*, which may be examples of a source cell and target cell described with reference to FIGS. 1-5. Process flow 600 also illustrates aspects of techniques performed by a serving gateway 610, which may be an example of a serving gateway described with reference to FIGS. 1 and 5. Process flow 600 may implement aspects of wireless communications system 400. For example, the process flow 600 may support efficient techniques for facilitating a handover at a UE 115 from a source cell to a target cell.

At 615, the UE 115-*e* and the UE 115-*f* may receive a handover command from the source cell 605-*a* indicating a configuration of the target cell 605-*b*. The UE 115-*e* and the UE 115-*f* may store the configuration of the target cell 605-*b* to use at a later time to perform a handover to the target cell 605-*b*. At 620, the UE 115-*e* and the UE 115-*f* may exchange packet data (e.g., communicate) with the source cell 605-*a*. The source cell 605-*a* may also communicate with the serving gateway 610 to identify data to transmit to the UE 115-*e* and the UE 115-*f*, and the source cell 605-*a* may communicate with the serving gateway 610 to process data received from the UE 115-*e* and the UE 115-*f*. At 625, the source cell 605-*a* may determine to trigger the UE 115-*e* and the UE 115-*f* to perform handovers from the source cell 605-*a* to the target cell 605-*b* using the configuration of the target cell 605-*b* received in the handover command.

In some cases, however, because the UE 115-*e* and the UE 115-*f* may receive the configuration of the target cell 605-*b* well in advance of performing the handover to the target cell 605-*b*, there is a chance that the configuration may be invalid by the time the source cell 605-*a* determines to trigger the UE 115-*e* and the UE 115-*f* to perform handovers to the target cell 605-*b*. Further, the UE 115-*e* and the UE 115-*f* may be configured with configurations of multiple target cells that may cover the UE 115-*e* and the UE 115-*f* at different times in the future. For example, the UE 115-*e* and the UE 115-*f* may receive the configurations of the multiple target cells when the UE 115-*e* and the UE 115-*f* transition to an RRC connected state. As described herein, to increase the chances that the handover command is still valid at the time of a handover, at 630, the source cell 605-*a* may transmit a request to the target cell 605-*b* to validate the configuration of the target cell 605-*b* included in the handover command. That is, the source cell 605-*a* may ask the target cell 605-*b* to activate or reserve resources configured in a handover command for a UE 115 to perform a handover to the target cell 605-*b* (e.g., check the validation of the handover command with the target cell 605-*b* before sending a handover indication to the UE 115).

At 635, the target cell 605-*b* may perform admission control and determine whether the configuration of the target cell 605-*b* included in the handover command is valid. If the target cell 605-*b* determines that the configuration is valid, at 640, the target cell 605-*b* may transmit, and the source cell 605-*a* may receive, an acknowledgment that the configuration of the target cell 605-*b* is validated. In some cases, the source cell 605-*a* may request validation of multiple configurations of the target cell 605-*b* configured for multiple UEs 115, and the target cell 605-*b* may respond with a list of validated configurations. For example, the target cell may transmit an indication of one or more validated configurations, one or more invalidated configurations, or both. At 645, the source cell 605-*a* may transmit a handover indication to the UE 115-*e* and the UE 115-*f* triggering the UE 115-*e* and the UE 115-*f* to perform the handover to the target cell 605-*b*.

In some cases, a relaxed execution condition may be defined for the conditional handover command. For instance, all UEs 115 currently meeting an entering condition may execute the conditional handover without a TTT timer expiring. Additionally, or alternatively, a new execution condition may be defined for handovers triggered with a handover indication (e.g., event A3 with a zero offset or negative offset and a TTT of zero). The execution condition may be preconfigured per UE 115 or may be common for multiple UEs 115. Further, the execution condition may override an execution condition associated with the conditional handover command. In some examples, the UE 115-*e* and the UE 115-*f* may perform the conditional handover if a measurement performed on the target cell 605-*b* is greater than a threshold, a measurement report is triggered, or a measurement performed on the target cell 605-*b* is greater than the same measurement performed on the source cell 605-*a*.

If the UE 115-*e* and the UE 115-*f* determine that the criteria in the conditional handover command is satisfied, or if the handover command fails to indicate conditions for a handover (e.g., the handover command is a forced handover command), the UE 115-*e* and the UE 115-*f* may initiate handover procedures to the target cell 605-*b*. In particular, at 650, the UE 115-*e* may execute the handover from the source cell 605-*a* to the target cell 605-*b* using the configuration of the target cell 605-*b* included in the handover command in response to receiving the handover indication triggering the handover. In some cases, the UE 115-*e* may determine that the handover procedure from the source cell 605-*a* to the target cell 605-*b* failed or was not initiated. Thus, the UE 115-*e* may transmit an indication to the source cell 605-*a* that the handover procedure failed or was not initiated. For example, the UE 115-*e* may transmit a response to the handover indication or a latest measurement report to indicate that the handover procedure failed or was not initiated.

Figure 7:
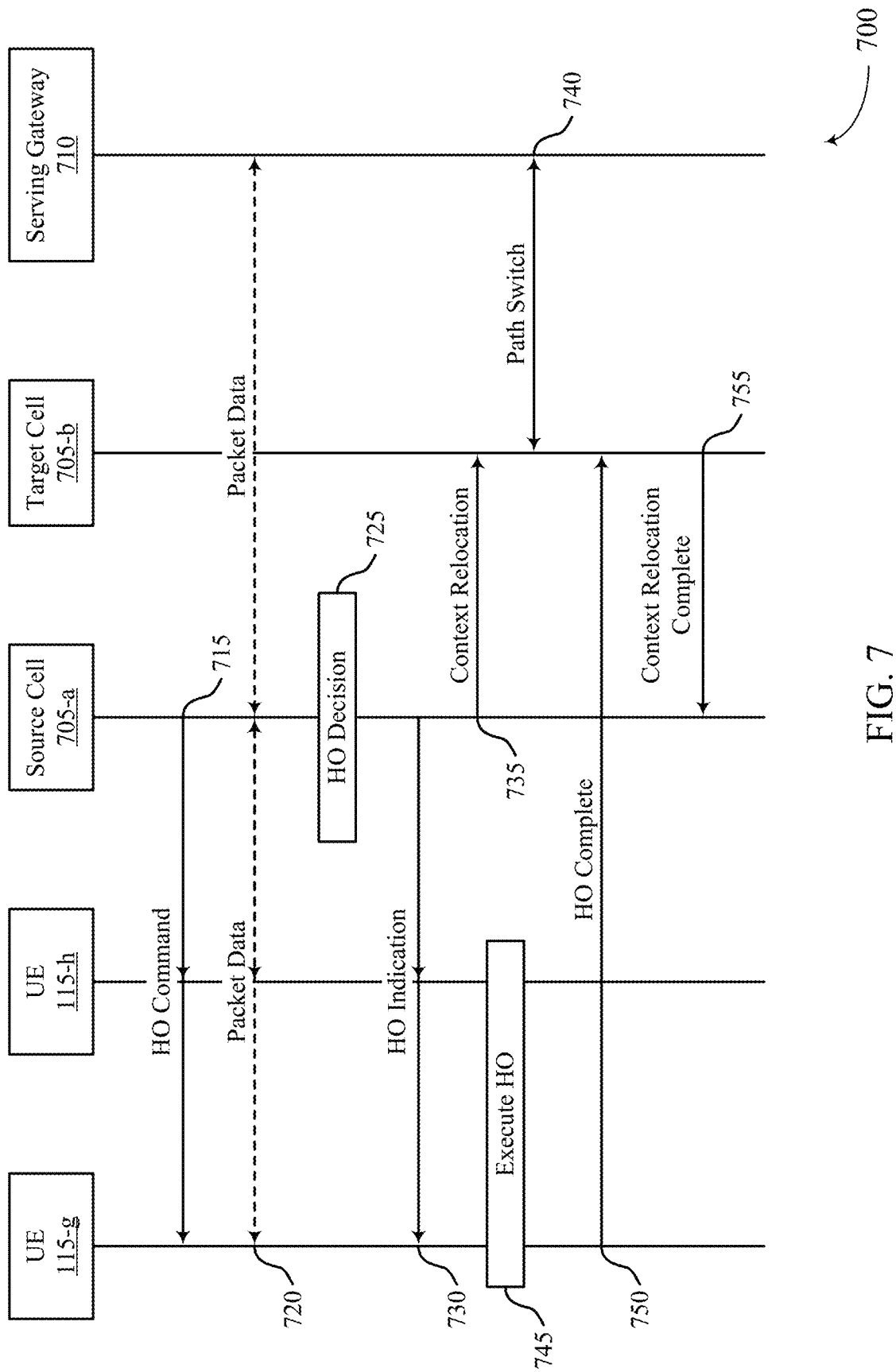
FIG. 7 illustrates an example of a process flow that supports network triggered handover in accordance with one or more aspects of the present disclosure.

FIG. 7 illustrates an example of a process flow 700 that supports network triggered handover in accordance with one or more aspects of the present disclosure. Process flow 700 illustrates aspects of techniques performed by a UE 115-*g* and a UE 115-*h*, which may be examples of a UE 115 described with reference to FIGS. 1-6. Process flow 700 also illustrates aspects of techniques performed by a source cell 705-*a* and a target cell 705-*b*, which may be examples of a source cell and target cell described with reference to FIGS. 1-6. Process flow 700 also illustrates aspects of techniques performed by a serving gateway 710, which may be an example of a serving gateway described with reference to FIGS. 1, 5, and 6. Process flow 700 may implement aspects of wireless communications system 400. For example, the process flow 700 may support efficient techniques for facilitating a handover at a UE 115 from a source cell to a target cell.

At 715, the UE 115-*g* and the UE 115-*h* may receive a handover command from the source cell 705-*a* indicating a configuration of the target cell 705-*b*. The UE 115-*e* and the UE 115-*f* may store the configuration of the target cell 705-*b* to use at a later time to perform a handover to the target cell 705-*b*. At 720, the UE 115-*g* and the UE 115-*h* may exchange packet data (e.g., communicate) with the source cell 705-*a*. The source cell 705-*a* may also communicate with the serving gateway 710 to identify data to transmit to the UE 115-*g* and the UE 115-*h*, and the source cell 705-*a* may communicate with the serving gateway 710 to process data received from the UE 115-*g* and the UE 115-*h*. At 725, the source cell 705-*a* may determine to trigger the UE 115-*g* and the UE 115-*h* to perform handovers from the source cell 705-*a* to the target cell 705-*b* using the configuration of the target cell 705-*b* received in the handover command.

Thus, at 730, the source cell 705-*a* may transmit a handover indication to the UE 115-*g* and the UE 115-*h* triggering the UE 115-*g* and the UE 115-*h* to perform the handover to the target cell 705-*b*. In addition, in the case of inter-satellite handover, the source cell 705-*a* may relocate the context of the UE 115-*g* and the UE 115-*h* to the target cell 705-*b* (e.g., before the handovers from these UEs 115 are even completed). Because the trajectory of the source cell 705-*a* and the target cell 705-*b* is known, an NTN may be able to determine that the target cell 705-*b* will be a next serving cell for the UE 115-*g* and the UE 115-*h*. Thus, whether or not the handover procedure is successful, the contexts of the UE 115-*g* and the UE 115-*h* may be relocated to the target cell 705-*b*. At 735, the source cell 705-*a* may transmit a request to relocate the contexts of the UE 115-*g* and the UE 115-*h* to the target cell 705-*b* (e.g., after sending the handover indication or execute command to the UE 115-*g* and the UE 115-*h*). At 740, the target cell 705-*b* may perform a path switch with the serving gateway 710 to inform the serving gateway 710 that the contexts of the UE 115-*g* and the UE 115-*h* are at the target cell 705-*b*.

At 745, the UE 115-*g* and the UE 115-*h* may then perform a handover from the source cell 705-*a* to the target cell 705-*b*. The handover performed by the UE 115-*g* may be successful, and, at 750, the UE 115-*g* may transmit a handover complete message to the target cell 705-*b*. However, the handover procedure performed by the UE 115-*h* may be unsuccessful. Accordingly, the UE 115-*h* may re-establish a connection with the target cell 705-*b* (e.g., since the context of the UE 115-*h* may be relocated to the target cell 705-*b*). In some cases, the UE 115-*h* may re-establish a connection with the target cell 705-*b* using the configuration of the target cell 705-*b* received in the handover command. That is, if the handover fails and the re-establishment is triggered, the UE 115-*h* may not revert its configuration. The UE 115-*h* may keep the configuration of the target cell 705-*b* and initiate the re-establishment procedure. That is, the UE 115-*h* may send a re-establishment request to the target cell 706-*b* with the re-establishment identity of the target cell 705-*b*.

In some cases, whether to apply a configuration of the source cell 705-*a* or a configuration of the target cell 705-*b* may be indicated by the source cell 705-*a* (e.g., in the handover command). That is, the source cell 705-*a* may transmit an indication of a configuration for the UE 115-*g* and the UE 115-*h* to use to re-establish a connection to the UE 115-*g* and the UE 115-*h*. If there is a target cell (or target satellite) with multiple candidate cells, the source cell 705-*a* may indicate that the UE 115-*g* or the UE 115-*h* is to keep a configuration of the target cell 705-*b* for re-establishment. By relocating the context of the UE 115-*g* and the UE 115-*h* to the target cell 705-*b*, the delay incurred by the large propagation delay between a satellite and the serving gateway 710 (e.g., on the ground for the path switch) may be reduced. At 755, the target cell 705-*b* may transmit a context relocation complete message to the source cell 705-*a* indicating that the relocation of the context of the UE 115-*g*, the context of the UE 115-*h*, or both is complete.

Figure 8:
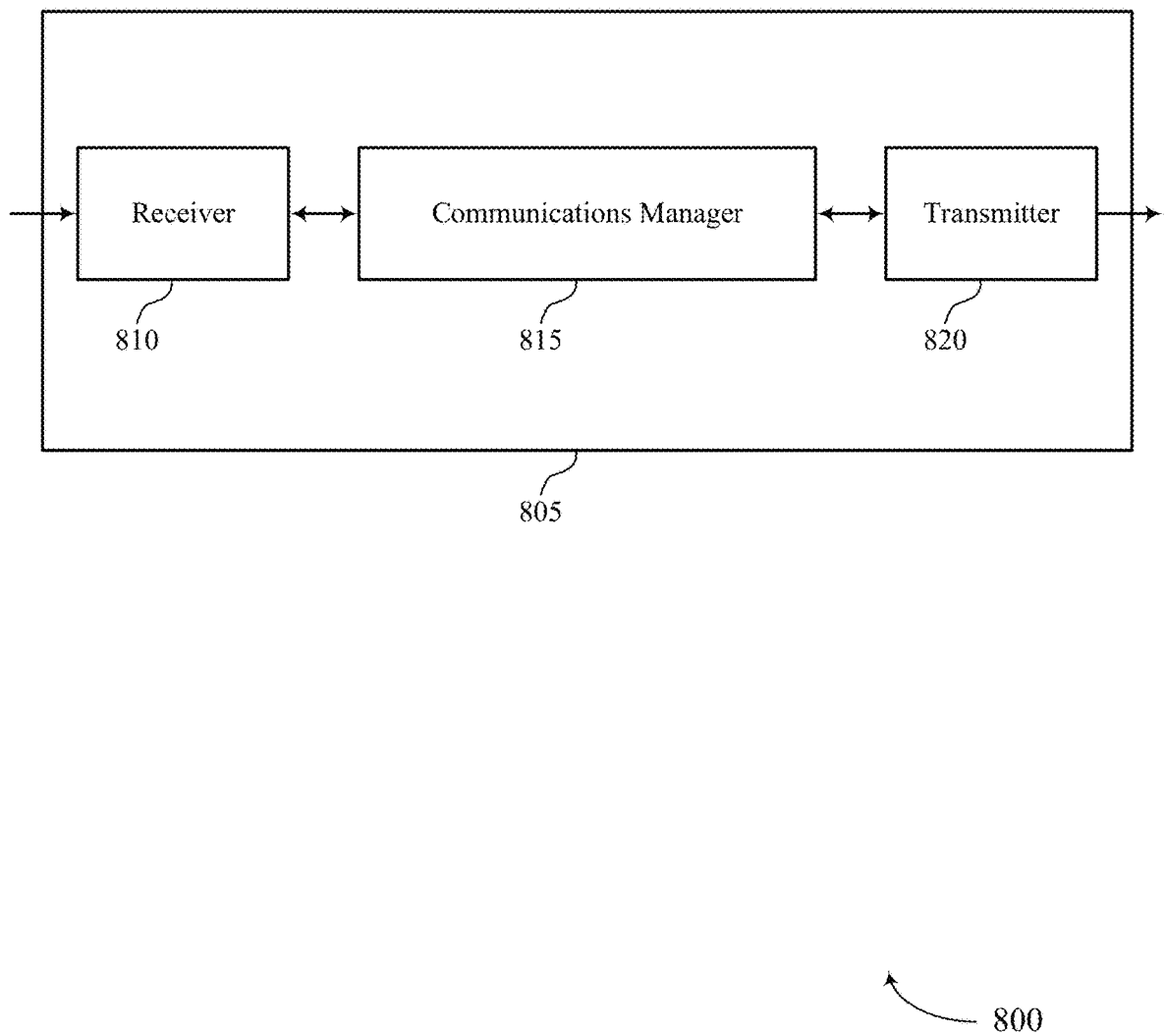
FIGS. 8 and 9 show block diagrams of devices that support network triggered handover in accordance with one or more aspects of the present disclosure.

FIG. 8 shows a block diagram 800 of a device 805 that supports network triggered handover in accordance with one or more aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to network triggered handover, etc.). Information may be passed on to other components of the device 805. The receiver 810 may be an example of aspects of the transceiver 1120 described with reference to FIG. 11. The receiver 810 may utilize a single antenna or a set of antennas.

The receiver 810 may be an example of means for performing various aspects that support network triggered handover as described herein. The receiver 810, or its sub-components, may be implemented in hardware (e.g., in receiver or transceiver circuitry). The circuitry may comprise a processor, a digital signal processor (DSP), an application-specific integrated circuit (ASIC), a field programmable gate array (FPGA), or other programmable logic device, discrete gate or transistor logic, discrete hardware components, or any combination thereof designed to perform the functions described in the present disclosure.

In some examples or implementations, receiver 810, or its sub-components, may be implemented in code (e.g., as receiver or transceiver management software or firmware) executed by a processor, or any combination thereof. If implemented in code executed by a processor, the functions of the receiver 810, or its sub-components may be executed by a general-purpose processor, a DSP, an ASIC, an FPGA, or other programmable logic device.

The communications manager 815 may receive, from a satellite at a first time period, a first control message including a configuration of a target cell to use at a second time period for performing a handover procedure from a source cell to the target cell, the second time period occurring after the first time period, receive, from the satellite at the second time period, a second control message triggering the UE to perform the handover procedure from the source cell to the target cell, and perform the handover procedure from the source cell to the target cell using the configuration of the target cell included in the first control message in response to receiving the second control message. The communications manager 815 may be an example of aspects of the communications manager 1110 described herein.

The communications manager 815 may be an example of means for performing various aspects that support network triggered handover as described herein. The communications manager 815, or its sub-components, may be implemented in hardware (e.g., in communications management circuitry). The circuitry may comprise a processor, a DSP, an ASIC, an FPGA, or other programmable logic device, discrete gate or transistor logic, discrete hardware components, or any combination thereof designed to perform the functions described in the present disclosure.

In another implementation, the communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 815 to provide or support a means for performing various operations (e.g., receiving, performing, selecting, establishing, transmitting, etc.) using or otherwise in cooperation with the receiver 810, transmitter 820, or both The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The transmitter 820 may be an example of means for performing various aspects that support network triggered handover as described herein. The transmitter 820, or its sub-components, may be implemented in hardware (e.g., in transmitter or transceiver circuitry). The circuitry may comprise a DSP, an ASIC, an FPGA, or other programmable logic device, discrete gate or transistor logic, discrete hardware components, or any combination thereof designed to perform the functions described in the present disclosure.

In some examples or implementations, transmitter 820, or its sub-components, may be implemented in code (e.g., as transmitter or transceiver management software or firmware) executed by a processor, or any combination thereof. If implemented in code executed by a processor, the functions of the transmitter 820, or its sub-components may be executed by a general-purpose processor, a DSP, an ASIC, an FPGA, or other programmable logic device.

Figure 9:
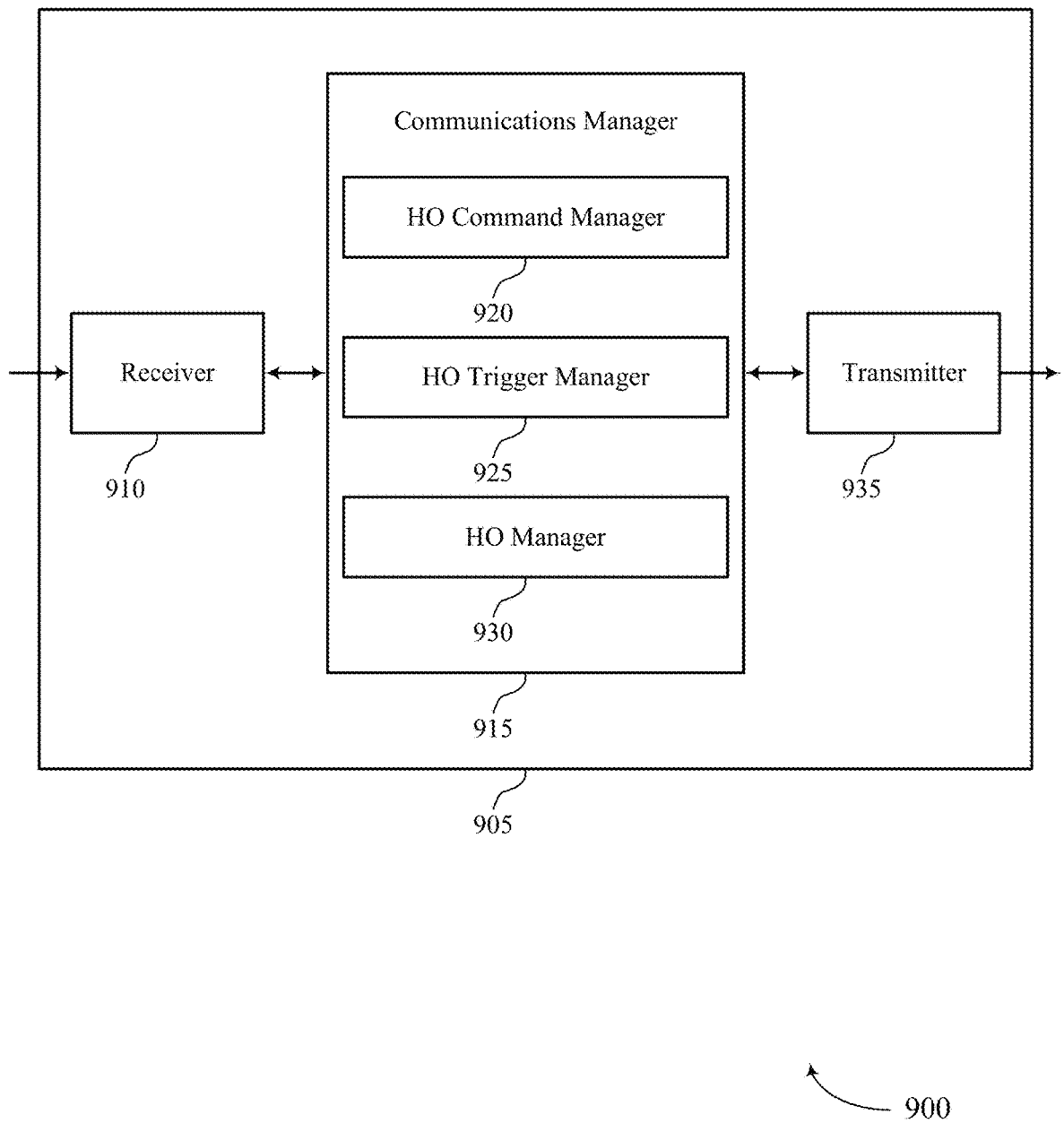

FIG. 9 shows a block diagram 900 of a device 905 that supports network triggered handover in accordance with one or more aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to network triggered handover, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a handover (HO) command manager 920, an HO trigger manager 925, and an HO manager 930. The communications manager 915 may be an example of aspects of the communications manager 1110 described herein.

The HO command manager 920 may receive, from a satellite at a first time period, a first control message including a configuration of a target cell to use at a second time period for performing a handover procedure from a source cell to the target cell, the second time period occurring after the first time period. The HO trigger manager 925 may receive, from the satellite at the second time period, a second control message triggering the UE to perform the handover procedure from the source cell to the target cell. The HO manager 930 may perform the handover procedure from the source cell to the target cell using the configuration of the target cell included in the first control message in response to receiving the second control message.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
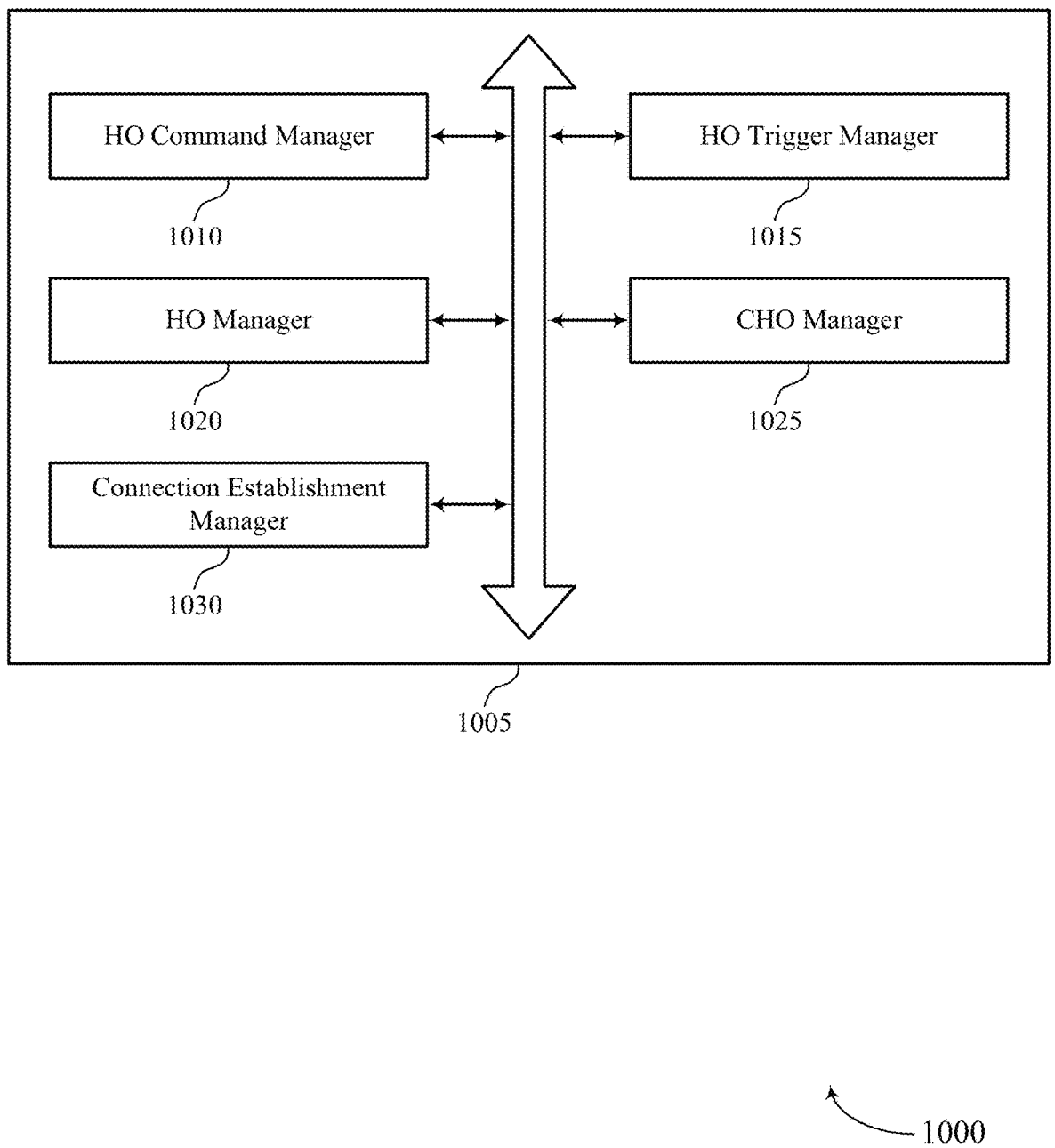
FIG. 10 shows a block diagram of a communications manager that supports network triggered handover in accordance with one or more aspects of the present disclosure.

FIG. 10 shows a block diagram 1000 of a communications manager 1005 that supports network triggered handover in accordance with one or more aspects of the present disclosure. The communications manager 1005 may be an example of aspects of a communications manager 815, a communications manager 915, or a communications manager 1110 described herein. The communications manager 1005 may include an HO command manager 1010, an HO trigger manager 1015, an HO manager 1020, a conditional handover (CHO) manager 1025, and a connection establishment manager 1030. Each of these modules may communicate, directly or indirectly, with one another (e.g., via one or more buses).

The HO command manager 1010 may receive, from a satellite at a first time period, a first control message including a configuration of a target cell to use at a second time period for performing a handover procedure from a source cell to the target cell, the second time period occurring after the first time period. The HO trigger manager 1015 may receive, from the satellite at the second time period, a second control message triggering the UE to perform the handover procedure from the source cell to the target cell. The HO manager 1020 may perform the handover procedure from the source cell to the target cell using the configuration of the target cell included in the first control message in response to receiving the second control message.

The CHO manager 1025 may determine that at least one criterion for performing the conditional handover procedure is satisfied, where performing the handover procedure is based on the determining. In some examples, the CHO manager 1025 may perform a measurement on the target cell and determine that the measurement is greater than a threshold. In some examples, the CHO manager 1025 may determine that a measurement report for the target cell is triggered. In some examples, the CHO manager 1025 may perform a measurement on the target cell and the source cell and determine that the measurement performed on the target cell is greater than or equal to the measurement performed on the source cell.

In some examples, the HO trigger manager 1015 may receive, in the second control message, an indication of reserved resources for performing contention-free random-access to connect to the target cell or for performing the handover procedure to the target cell without a random-access procedure. In some examples, the HO manager 1020 may determine that the handover procedure from the source cell to the target cell failed or was not initiated. In some cases of handover failure, the connection establishment manager 1030 may select a cell with which the UE is to establish a connection and establish the connection with the selected cell (e.g., the target cell) using the configuration of the target cell received in the first control message. In some examples, the HO manager 1020 may transmit, to the source cell, an indication that the handover procedure failed or was not initiated, where the indication that the handover procedure failed or was not initiated includes a response to the second control message or a latest measurement report.

In some cases, the first control message includes a set of configurations of a set of target cells to use for performing handover procedures to the set of target cells. In some examples, the HO command manager 1010 may receive an indication to release at least one of the set of configurations of the set of target cells. In some examples, the HO command manager 1010 may release the at least one of the set of configurations. In some cases, the second control message indicates that a context of the UE is relocated to the target cell. In some cases, the second control message indicates that a TTT timer for performing the handover procedure shall expire (e.g., expire upon receiving the second control message) or is reduced if the TTT timer is running. In some cases, the second control message indicates that resources reserved for at least one of a plurality of target cells are activated. In some cases, the second control message provides a new resource for performing synchronization to at least one of a plurality of target cells. In some cases, the second control message includes a downlink control information message, a MAC-CE, or a radio resource control message. In some cases, the second control message is specific to the UE or specific to a group of UEs including the UE. In some cases, the UE, the source cell, and the target cell are operating in an NTN.

Figure 11:
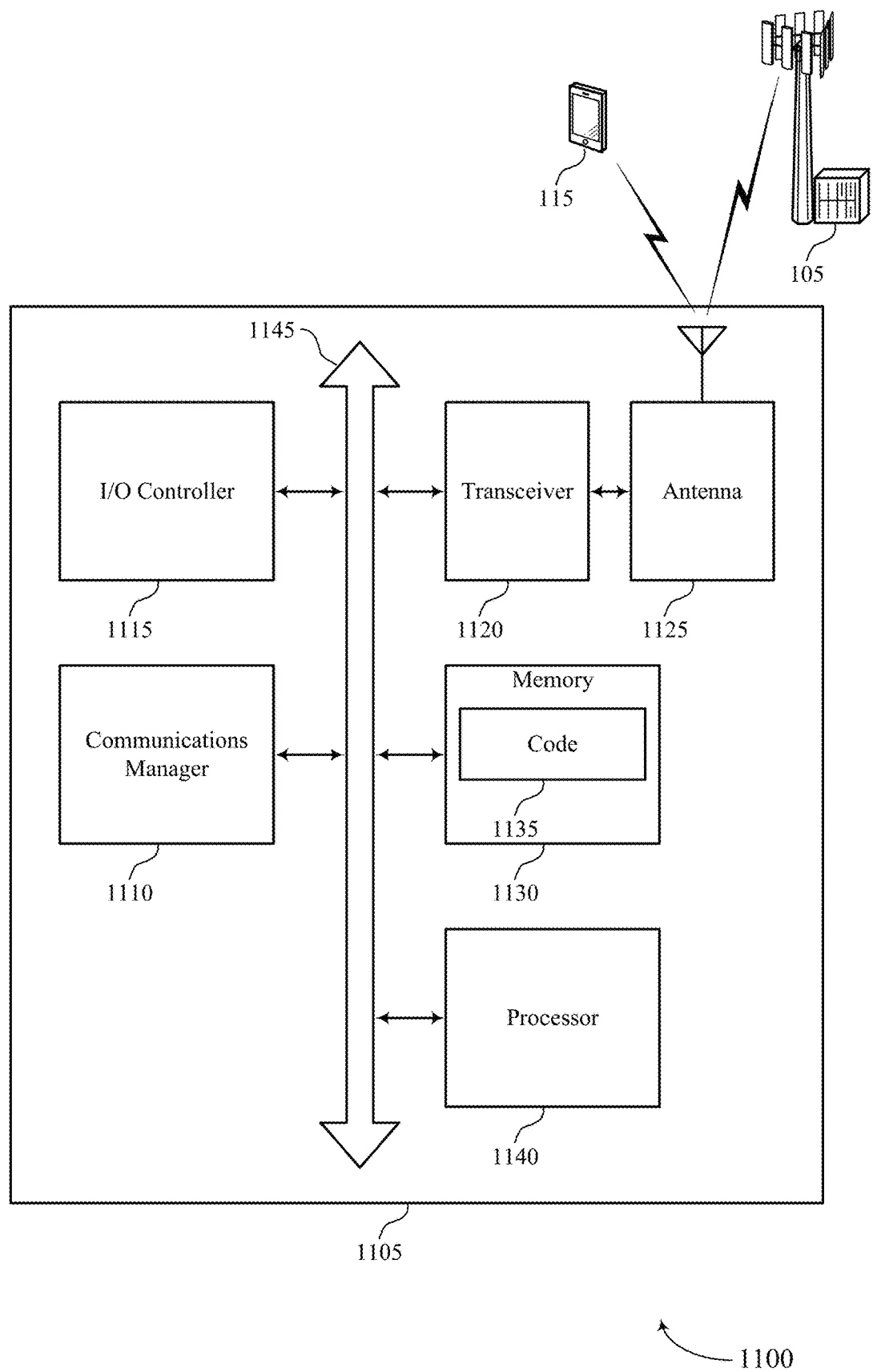
FIG. 11 shows a diagram of a system including a device that supports network triggered handover in accordance with one or more aspects of the present disclosure.

FIG. 11 shows a diagram of a system 1100 including a device 1105 that supports network triggered handover in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a satellite at a first time period, a first control message including a configuration of a target cell to use at a second time period for performing a handover procedure from a source cell to the target cell, the second time period occurring after the first time period, receive, from the satellite at the second time period, a second control message triggering the UE to perform the handover procedure from the source cell to the target cell, and perform the handover procedure from the source cell to the target cell using the configuration of the target cell included in the first control message in response to receiving the second control message.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting network triggered handover).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
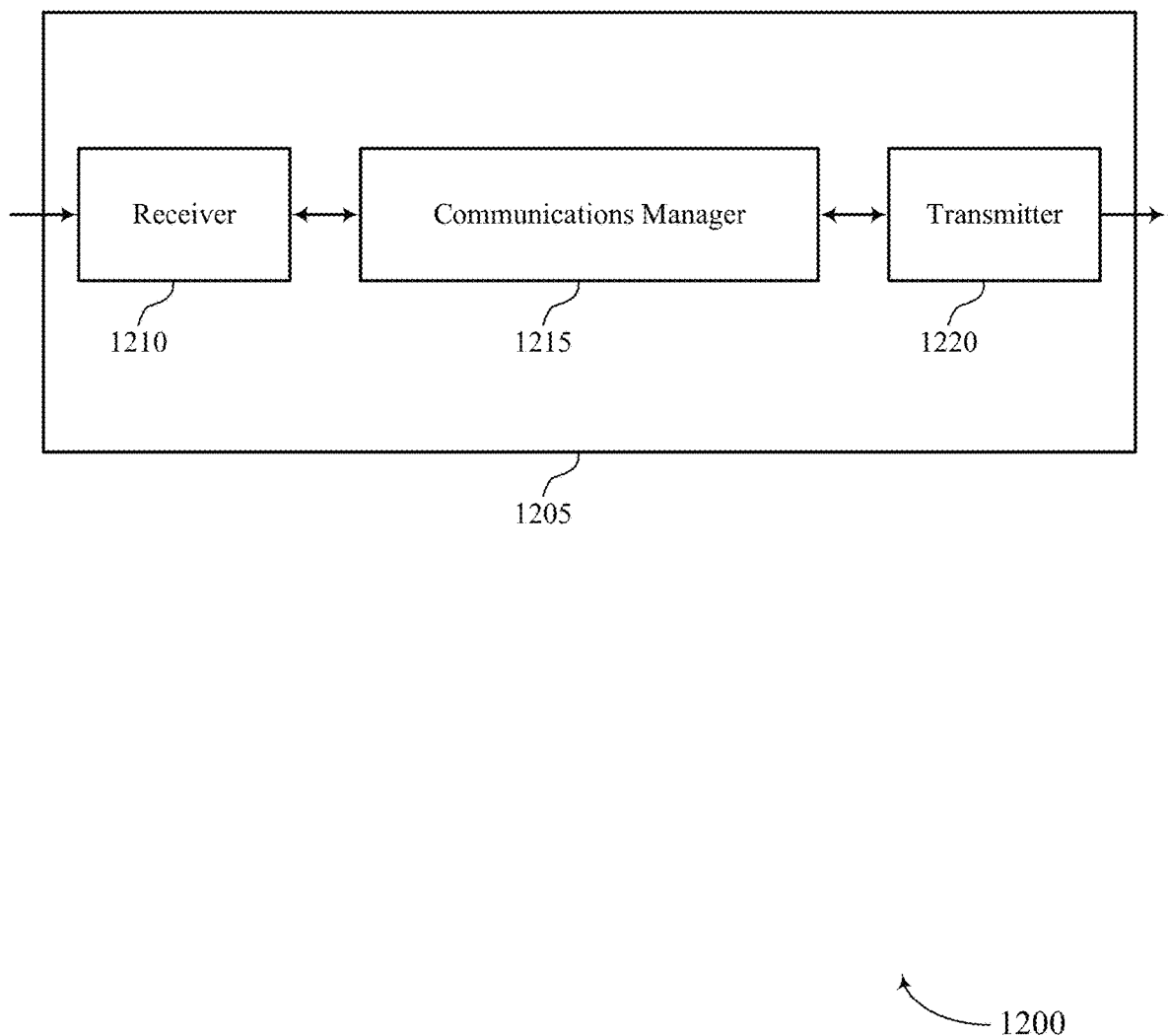
FIGS. 12 and 13 show block diagrams of devices that support network triggered handover in accordance with one or more aspects of the present disclosure.

FIG. 12 shows a block diagram 1200 of a device 1205 that supports network triggered handover in accordance with one or more aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to network triggered handover, etc.). Information may be passed on to other components of the device 1205. The receiver 1210 may be an example of aspects of the transceiver 1520 described with reference to FIG. 15. The receiver 1210 may utilize a single antenna or a set of antennas.

The receiver 1210 may be an example of means for performing various aspects that support network triggered handover as described herein. The receiver 1210, or its sub-components, may be implemented in hardware (e.g., in receiver or transceiver circuitry). The circuitry may comprise a processor, a DSP, an ASIC, an FPGA, or other programmable logic device, discrete gate or transistor logic, discrete hardware components, or any combination thereof designed to perform the functions described in the present disclosure.

In some examples or implementations, receiver 1210, or its sub-components, may be implemented in code (e.g., as receiver or transceiver management software or firmware) executed by a processor, or any combination thereof. If implemented in code executed by a processor, the functions of the receiver 1210, or its sub-components may be executed by a general-purpose processor, a DSP, an ASIC, an FPGA, or other programmable logic device.

The communications manager 1215 may transmit a first control message to a UE including a configuration of a target cell for the UE to use to perform a handover procedure from the source cell to the target cell, the first control message being transmitted at a first time period, determine to trigger the UE to perform the handover procedure from the source cell to the target cell, and transmit a second control message to the UE triggering the UE to perform the handover procedure from the source cell to the target cell using the configuration of the target cell based on the determining, the second control message being transmitted at a second time period, the second time period occurring after the first time period.

The communications manager 1215 may be an example of means for performing various aspects that support network triggered handover as described herein. The communications manager 1215, or its sub-components, may be implemented in hardware (e.g., in communications management circuitry). The circuitry may comprise a processor, a DSP, an ASIC, an FPGA, or other programmable logic device, discrete gate or transistor logic, discrete hardware components, or any combination thereof designed to perform the functions described in the present disclosure.

In another implementation, the communications manager 1215 may also receive, from a source cell, a request for the target cell to validate a configuration of the target cell stored at a UE, transmit an acknowledgment indicating that the configuration of the target cell is validated, and receive an indication from the UE that a handover procedure from the source cell to the target cell is completed. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

In some examples, the communications manager 1215 to provide or support a means for performing various operations (e.g., receiving, performing, transmitting, etc.) using or otherwise in cooperation with the receiver 1210, transmitter 1220, or both.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

The transmitter 1220 may be an example of means for performing various aspects that support network triggered handover as described herein. The transmitter 1220, or its sub-components, may be implemented in hardware (e.g., in transmitter or transceiver circuitry). The circuitry may comprise a DSP, an ASIC, an FPGA, or other programmable logic device, discrete gate or transistor logic, discrete hardware components, or any combination thereof designed to perform the functions described in the present disclosure.

In some examples or implementations, transmitter 1220, or its sub-components, may be implemented in code (e.g., as transmitter or transceiver management software or firmware) executed by a processor, or any combination thereof. If implemented in code executed by a processor, the functions of the transmitter 1220, or its sub-components may be executed by a general-purpose processor, a DSP, an ASIC, an FPGA, or other programmable logic device.

Figure 13:
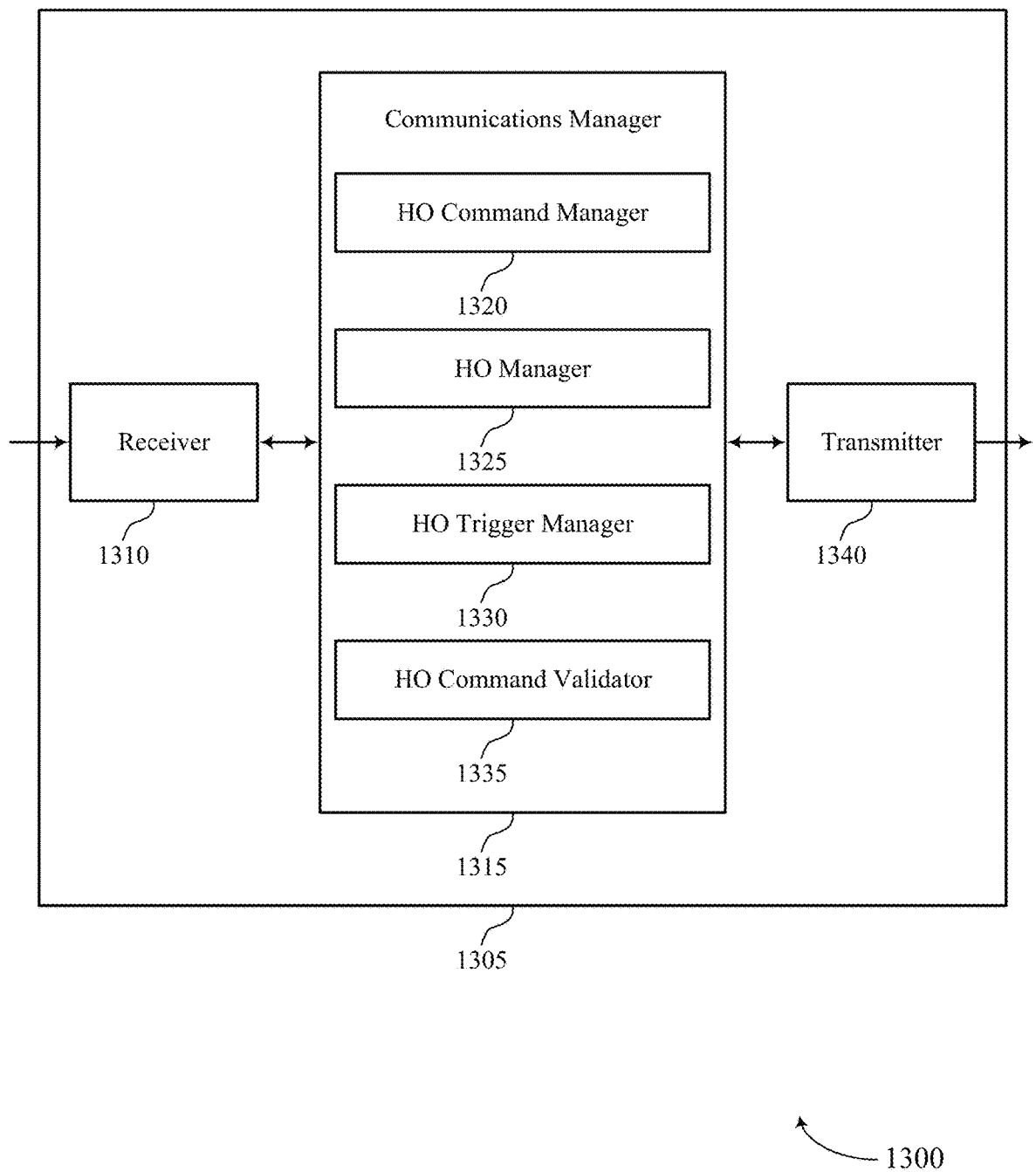

FIG. 13 shows a block diagram 1300 of a device 1305 that supports network triggered handover in accordance with one or more aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to network triggered handover, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an HO command manager 1320, an HO manager 1325, an HO trigger manager 1330, and an HO command validator 1335. The communications manager 1315 may be an example of aspects of the communications manager 1510 described herein.

The HO command manager 1320 may transmit a first control message to a UE including a configuration of a target cell for the UE to use to perform a handover procedure from the source cell to the target cell, the first control message being transmitted at a first time period. The HO manager 1325 may determine to trigger the UE to perform the handover procedure from the source cell to the target cell. The HO trigger manager 1330 may transmit a second control message to the UE triggering the UE to perform the handover procedure from the source cell to the target cell using the configuration of the target cell based on the determining, the second control message being transmitted at a second time period, the second time period occurring after the first time period.

The HO command validator 1335 may receive, from a source cell, a request for the target cell to validate a configuration of the target cell stored at a UE and transmit an acknowledgment indicating that the configuration of the target cell is validated. The HO manager 1325 may receive an indication from the UE that a handover procedure from the source cell to the target cell is completed.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
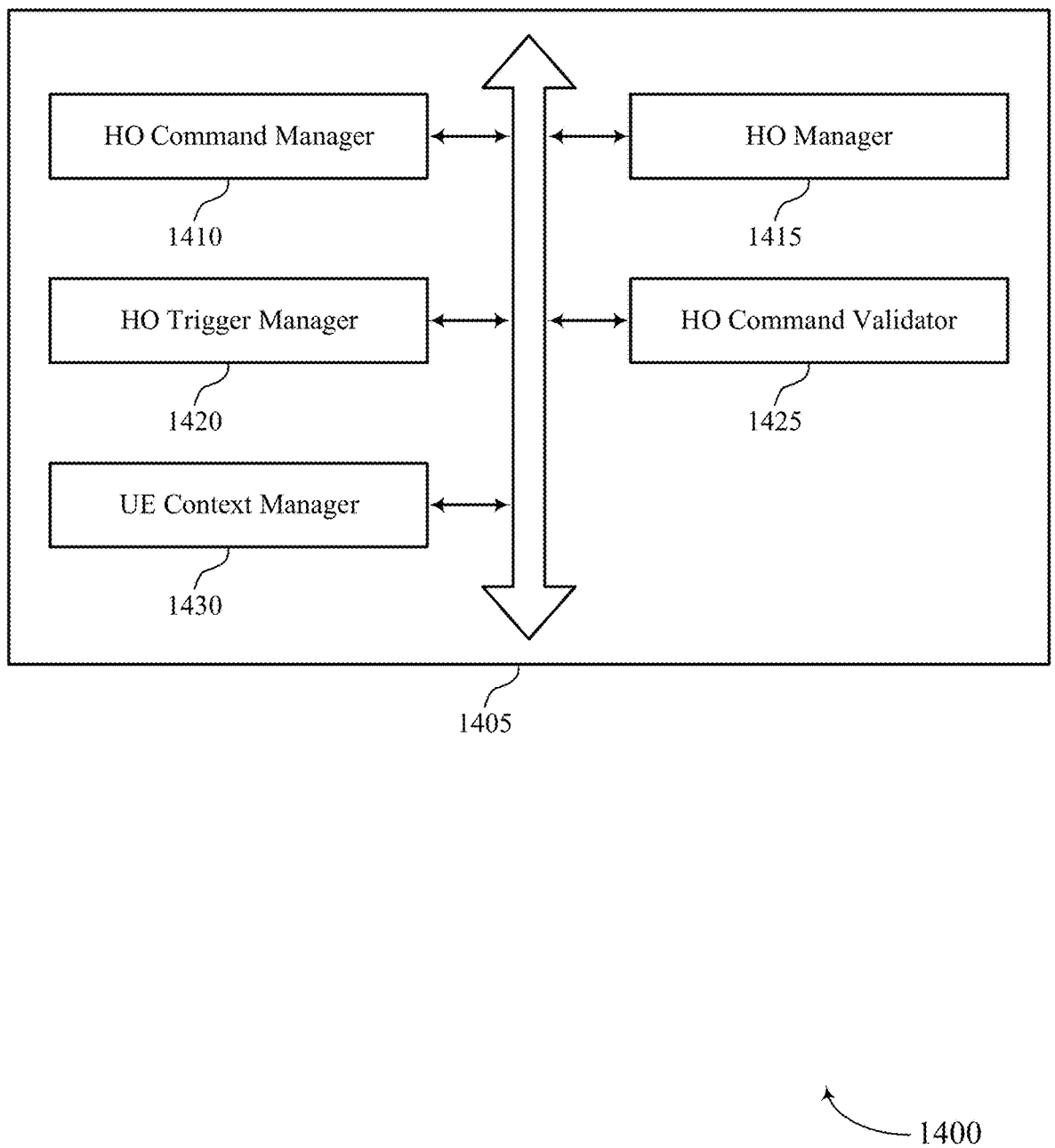
FIG. 14 shows a block diagram of a communications manager that supports network triggered handover in accordance with one or more aspects of the present disclosure.

FIG. 14 shows a block diagram 1400 of a communications manager 1405 that supports network triggered handover in accordance with one or more aspects of the present disclosure. The communications manager 1405 may be an example of aspects of a communications manager 1215, a communications manager 1315, or a communications manager 1510 described herein. The communications manager 1405 may include an HO command manager 1410, an HO manager 1415, an HO trigger manager 1420, an HO command validator 1425, and an UE context manager 1430. Each of these modules may communicate, directly or indirectly, with one another (e.g., via one or more buses).

The HO command manager 1410 may transmit a first control message to a UE including a configuration of a target cell for the UE to use to perform a handover procedure from the source cell to the target cell, the first control message being transmitted at a first time period. The HO manager 1415 may determine to trigger the UE to perform the handover procedure from the source cell to the target cell. The HO trigger manager 1420 may transmit a second control message to the UE triggering the UE to perform the handover procedure from the source cell to the target cell using the configuration of the target cell based on the determining, the second control message being transmitted at a second time period, the second time period occurring after the first time period.

In some examples, the HO command validator 1425 may transmit, to the target cell, a request for the target cell to validate the configuration of the target cell included in the first control message. In some examples, the HO command validator 1425 may receive, from the target cell, an acknowledgment that the configuration of the target cell is validated, where transmitting the second control message is based on receiving the acknowledgment. The UE context manager 1430 may transmit, to the target cell before the handover procedure is completed, a request to relocate a context of the UE. In some examples, the UE context manager 1430 may receive, from the target cell, a message indicating that relocation of the context of the UE is complete.

In some examples, the HO trigger manager 1420 may transmit, in the second control message, an indication of reserved resources for the UE to use to perform contention-free random-access to connect to the target cell or to perform the handover procedure to the target cell without a random-access procedure. In some examples, the HO trigger manager 1420 may determine to trigger the UE to perform the handover procedure from the source cell to the target cell based on a time and speed of the target cell, a location of the UE, a measurement report received from the UE, or a combination thereof. In some examples, the HO manager 1415 may receive, from the UE, an indication that the handover procedure failed or was not initiated. In some cases, the indication that the handover procedure failed or was not initiated includes a response to the second control message or a latest measurement report.

In some cases, the first control message includes a set of configurations of a set of target cells for the UE to use to perform handover procedures to the set of target cells. In some examples, the HO command manager 1410 may transmit an indication to release at least one of the set of configurations of the set of target cells. In some cases, the second control message indicates that a context of the UE is relocated to the target cell. In some cases, the second control message indicates that a TTT timer at the UE for performing the handover procedure shall expire or is reduced if the TTT timer is running. In some cases, the second control message indicates that resources reserved for at least one of a plurality of target cells are activated. In some cases, the second control message provides a new resource for performing synchronization to at least one of a plurality of target cells. In some cases, the second control message includes a downlink control information message, a MAC-CE, or a radio resource control message. In some cases, the second control message is specific to the UE or specific to a group of UEs including the UE. In some cases, the UE, the source cell, and the target cell are operating in an NTN.

The HO command validator 1425 may receive, from a source cell, a request for the target cell to validate a configuration of the target cell stored at a UE. In some examples, the HO command validator 1425 may transmit an acknowledgment indicating that the configuration of the target cell is validated. In some examples, the HO manager 1415 may receive an indication from the UE that a handover procedure from the source cell to the target cell is completed. In some examples, the UE context manager 1430 may receive, from the source cell before the handover procedure is completed, a request to relocate a context of the UE. In some examples, the UE context manager 1430 may transmit, to the source cell, a message indicating that relocation of the context of the UE is complete. In some examples, the UE context manager 1430 may perform a path switch with a serving gateway to indicate to the serving gateway that the context of the UE is at the target cell. In some cases, the UE, the source cell, and the target cell are operating in an NTN.

Figure 15:
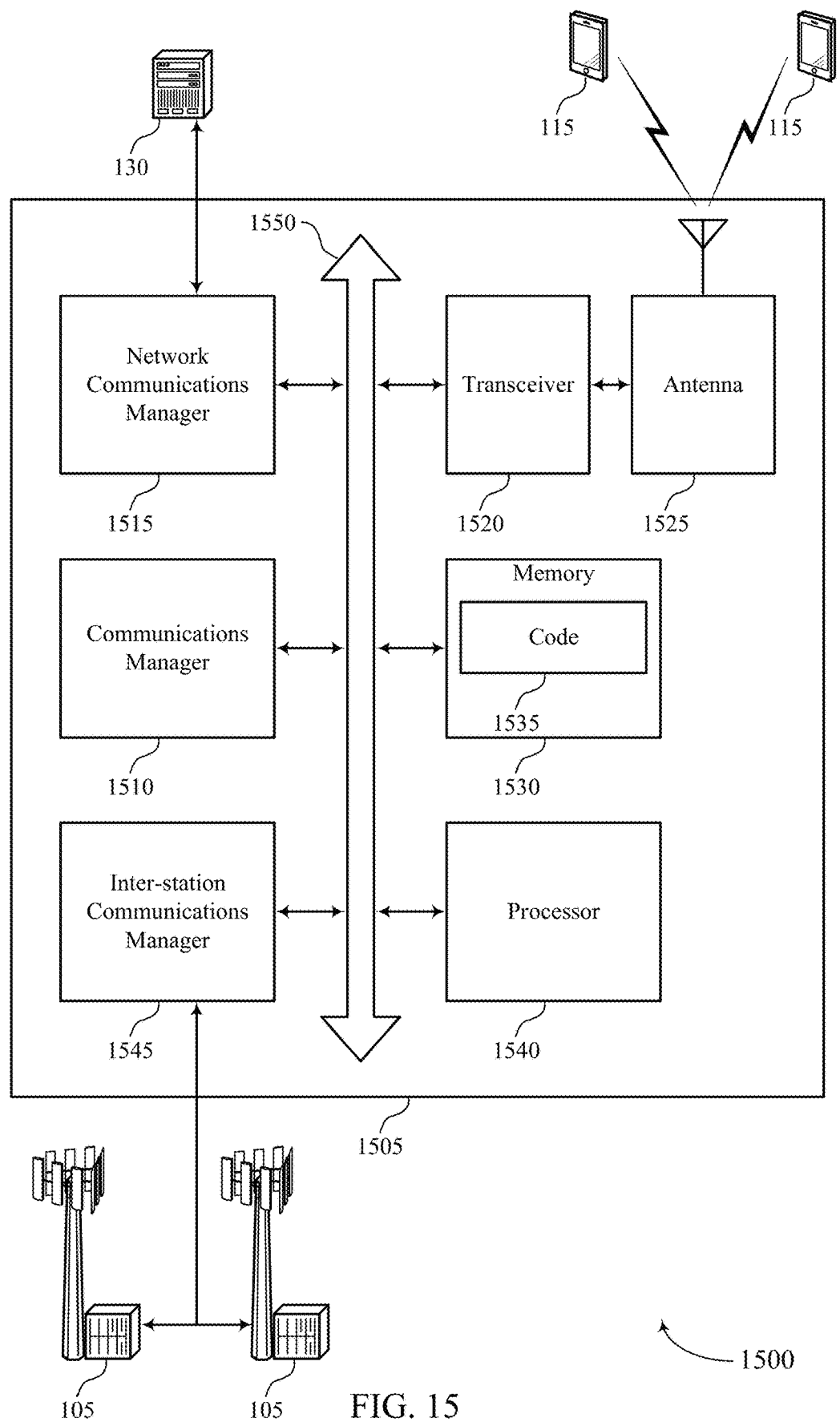
FIG. 15 shows a diagram of a system including a device that supports network triggered handover in accordance with one or more aspects of the present disclosure.

FIG. 15 shows a diagram of a system 1500 including a device 1505 that supports network triggered handover in accordance with one or more aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a first control message to a UE including a configuration of a target cell for the UE to use to perform a handover procedure from the source cell to the target cell, the first control message being transmitted at a first time period, determine to trigger the UE to perform the handover procedure from the source cell to the target cell, and transmit a second control message to the UE triggering the UE to perform the handover procedure from the source cell to the target cell using the configuration of the target cell based on the determining, the second control message being transmitted at a second time period, the second time period occurring after the first time period.

The communications manager 1510 may also receive, from a source cell, a request for the target cell to validate a configuration of the target cell stored at a UE, transmit an acknowledgment indicating that the configuration of the target cell is validated, and receive an indication from the UE that a handover procedure from the source cell to the target cell is completed.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting network triggered handover).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
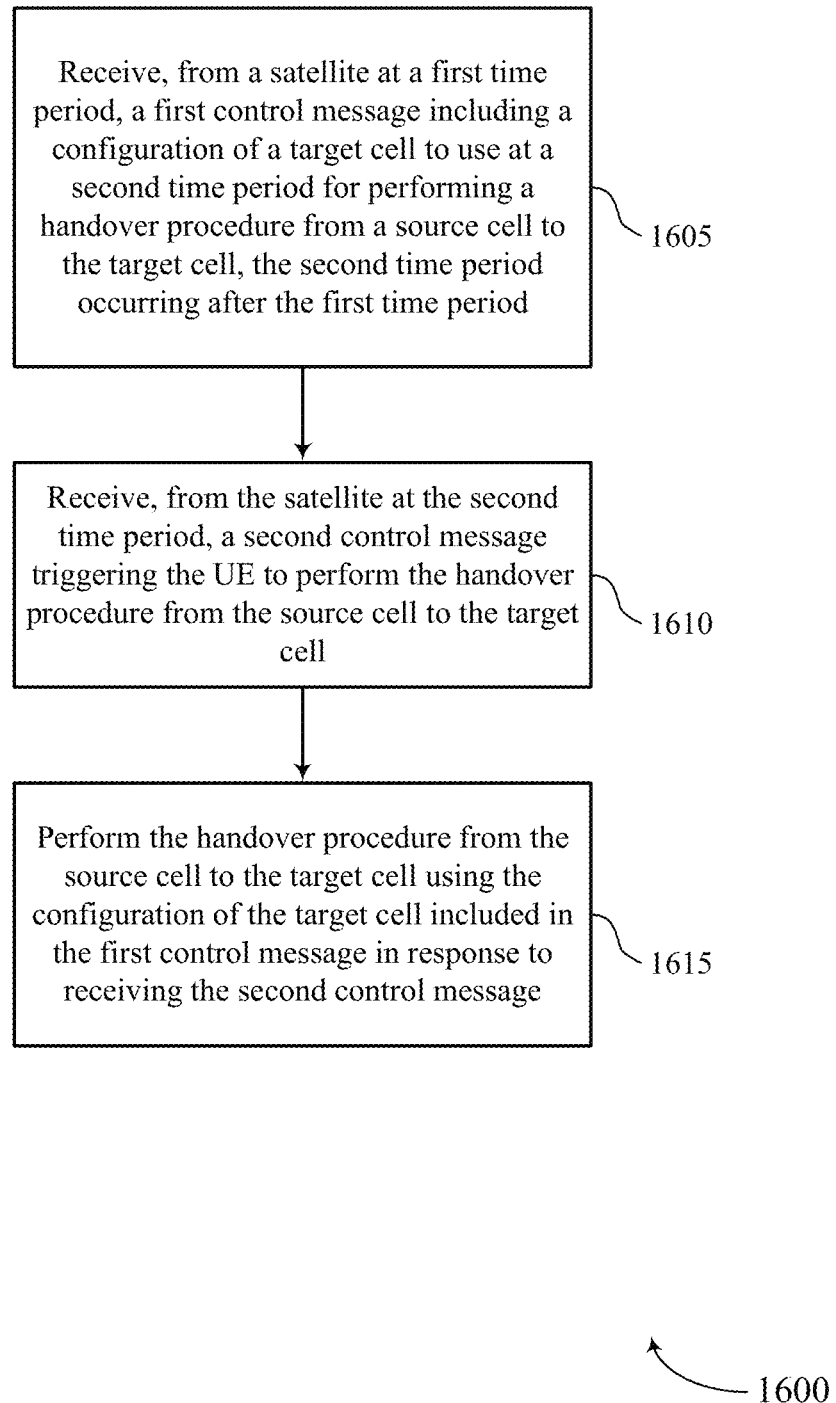
FIGS. 16 through 18 show flowcharts illustrating methods that support network triggered handover in accordance with one or more aspects of the present disclosure.

FIG. 16 shows a flowchart illustrating a method 1600 that supports network triggered handover in accordance with one or more aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may receive, from a satellite at a first time period, a first control message including a configuration of a target cell to use at a second time period for performing a handover procedure from a source cell to the target cell, the second time period occurring after the first time period. The operations of 1605 may be performed according to the methods described herein. In some examples, aspects of the operations of 1605 may be performed by an HO command manager as described with reference to FIGS. 8 through 11.

At 1610, the UE may receive, from the satellite at the second time period, a second control message triggering the UE to perform the handover procedure from the source cell to the target cell. The operations of 1610 may be performed according to the methods described herein. In some examples, aspects of the operations of 1610 may be performed by an HO trigger manager as described with reference to FIGS. 8 through 11.

At 1615, the UE may perform the handover procedure from the source cell to the target cell using the configuration of the target cell included in the first control message in response to receiving the second control message. The operations of 1615 may be performed according to the methods described herein. In some examples, aspects of the operations of 1615 may be performed by an HO manager as described with reference to FIGS. 8 through 11.

Figure 17:
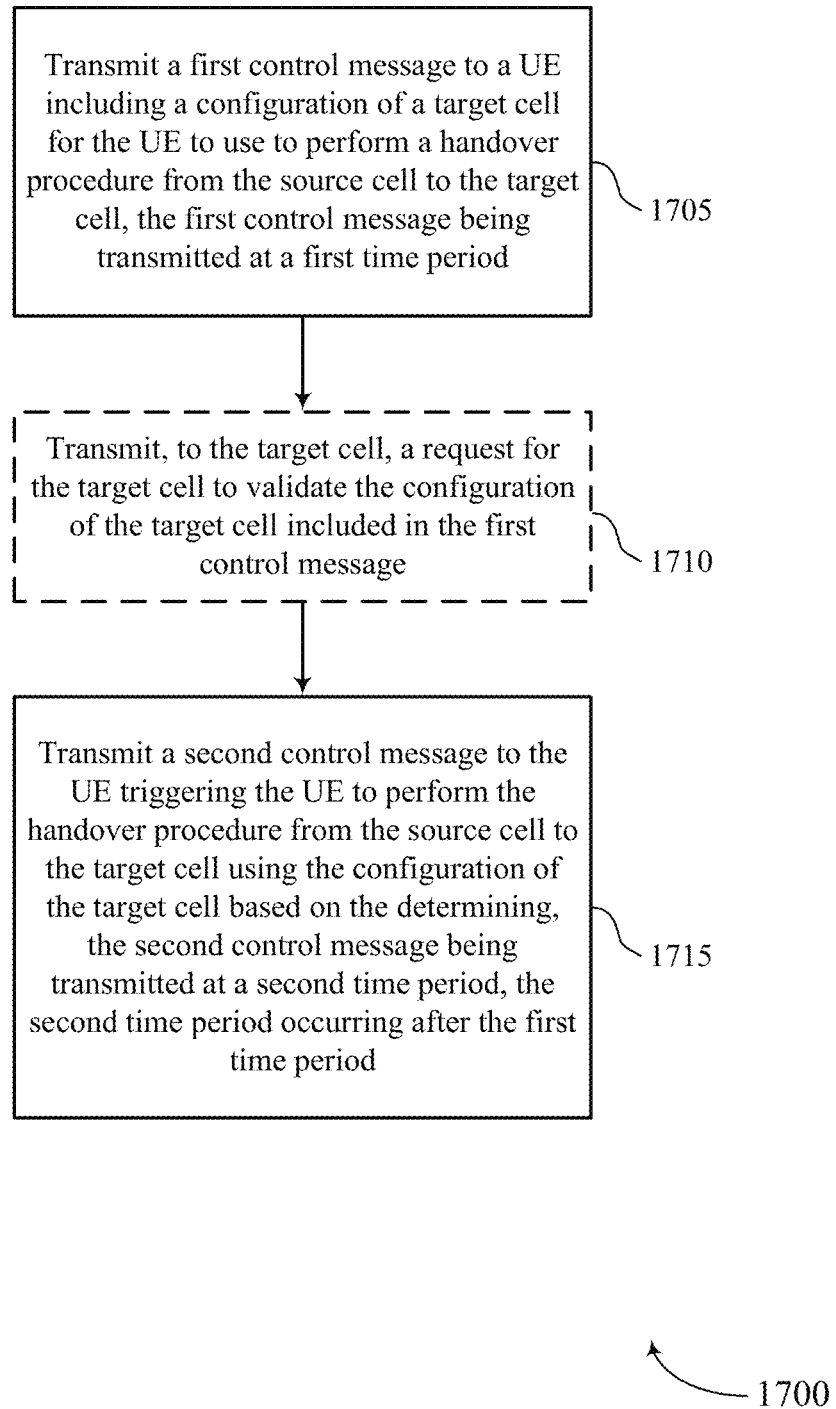

FIG. 17 shows a flowchart illustrating a method 1700 that supports network triggered handover in accordance with one or more aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1705, the base station (e.g., a source cell of the base station) may transmit a first control message to a UE including a configuration of a target cell for the UE to use to perform a handover procedure from the source cell to the target cell, the first control message being transmitted at a first time period. The operations of 1705 may be performed according to the methods described herein. In some examples, aspects of the operations of 1705 may be performed by an HO command manager as described with reference to FIGS. 12 through 15.

Optionally, at 1710, the base station (e.g., a source cell of the base station) may transmit, to the target cell, a request for the target cell to validate the configuration of the target cell included in the first control message. In some examples, aspects of the operations of 1710 may be performed by an HO command validator as described with reference to FIGS. 12 through 15.

At 1715, the base station (e.g., a source cell of the base station) may transmit a second control message to the UE triggering the UE to perform the handover procedure from the source cell to the target cell using the configuration of the target cell based at least in part on a triggering condition, the second control message being transmitted at a second time period, the second time period occurring after the first time period. The operations of 1715 may be performed according to the methods described herein. In some examples, aspects of the operations of 1715 may be performed by an HO trigger manager as described with reference to FIGS. 12 through 15.

Figure 18:
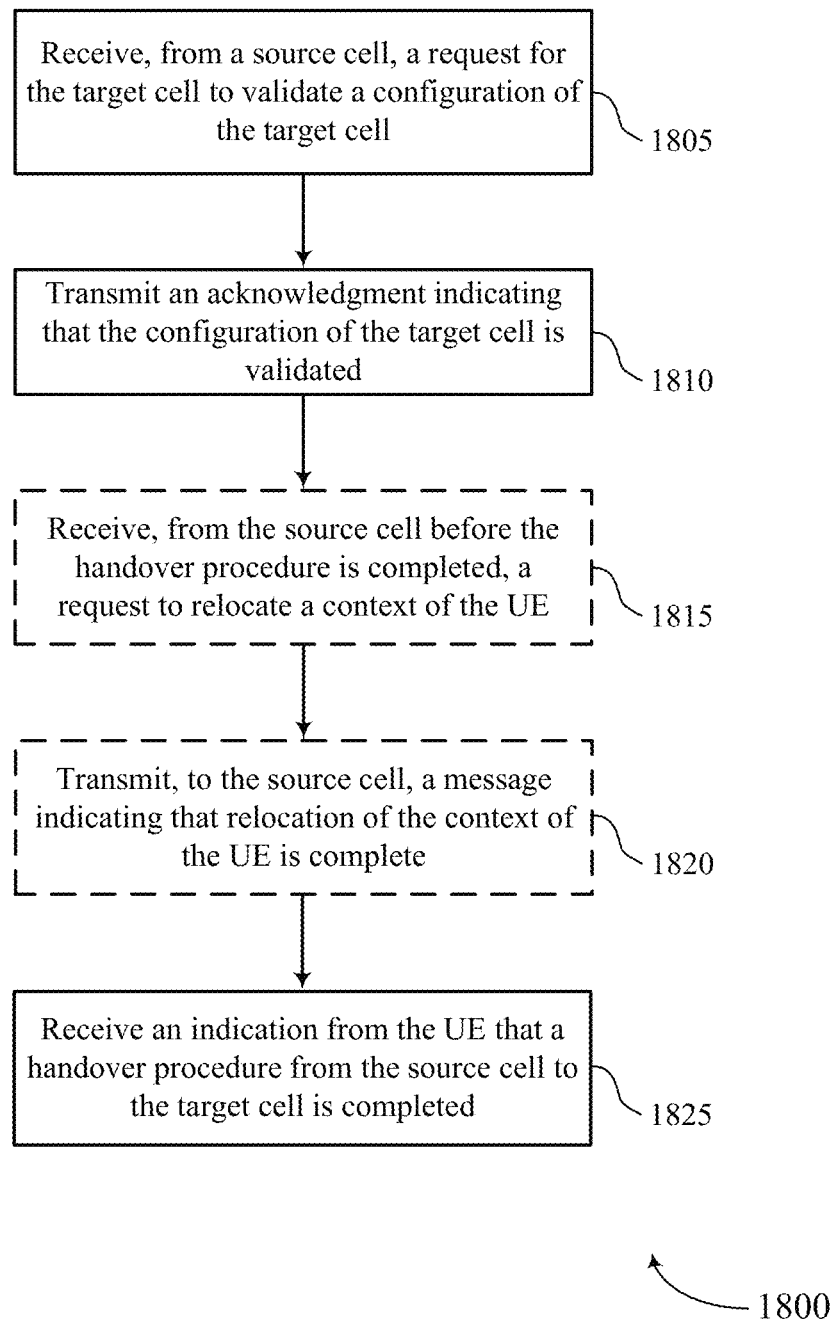

FIG. 18 shows a flowchart illustrating a method 1800 that supports network triggered handover in accordance with one or more aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1805, the base station (e.g., a target cell of the base station) may receive, from a source cell, a request for the target cell to validate a configuration of the target cell. The operations of 1805 may be performed according to the methods described herein. In some examples, aspects of the operations of 1805 may be performed by an HO command validator as described with reference to FIGS. 12 through 15.

At 1810, the base station (e.g., a target cell of the base station) may transmit an acknowledgment indicating that the configuration of the target cell is validated. The operations of 1810 may be performed according to the methods described herein. In some examples, aspects of the operations of 1810 may be performed by an HO command validator as described with reference to FIGS. 12 through 15.

Optionally, at 1815, the base station (e.g., a target cell of the base station) may receive, from the source cell before the handover procedure is completed, a request to relocate a context of the UE. The operations of 1815 may be performed according to the methods described herein. In some examples, aspects of the operations of 1815 may be performed by a UE context manager as described with reference to FIGS. 12 through 15.

Optionally, at 1820, the base station (e.g., a target cell of the base station) may transmit, to the source cell, a message indicating that relocation of the context of the UE is complete. The operations of 1815 may be performed according to the methods described herein. In some examples, aspects of the operations of 1815 may be performed by a UE context manager as described with reference to FIGS. 12 through 15.

At 1825, the base station (e.g., a target cell of the base station) may receive an indication from the UE that a handover procedure from the source cell to the target cell is completed. The operations of 1815 may be performed according to the methods described herein. In some examples, aspects of the operations of 1815 may be performed by an HO manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a satellite at a first time period, a first control message comprising a configuration of a target cell to use at a second time period for performing a handover procedure from a source cell to the target cell, the second time period occurring after the first time period; receiving, from the satellite at the second time period, a second control message triggering the UE to perform the handover procedure from the source cell to the target cell; and performing the handover procedure from the source cell to the target cell using the configuration of the target cell included in the first control message in response to receiving the second control message.

Aspect 2: The method of aspect 1, wherein the first control message comprises an indication of the second time period.

Aspect 3: The method of any of aspects 1 through 2, wherein the handover procedure comprises a conditional handover procedure after receiving the second control message and performing the handover procedure further comprises: performing that conditional handover procedure based at least in part on at least one criterion for performing the conditional handover procedure being satisfied.

Aspect 4: The method of any of aspects 1 through 3, further comprising: receiving, in the second control message, an indication of reserved resources for performing contention-free random-access to connect to the target cell or for performing the handover procedure to the target cell without a random-access procedure.

Aspect 5: The method of any of aspects 1 through 4, further comprising: selecting a cell different from the target cell with which the UE is to establish a connection based at least in part on a failure of the handover procedure or aborting the handover procedure; and establishing the connection with the cell using the configuration of the target cell received in the first control message.

Aspect 6: The method of any of aspects 1 through 5, further comprising: transmitting, to the source cell, an indication that the handover procedure failed or was aborted at some point, wherein the indication that the handover procedure failed or was aborted at some point comprises a response to the second control message or a latest measurement report.

Aspect 7: The method of any of aspects 1 through 6, wherein the first control message comprises a plurality of configurations of a plurality of target cells to use for performing handover procedures to the plurality of target cells.

Aspect 8: The method of aspect 7, further comprising: receiving an indication to release at least one of the plurality of configurations of the plurality of target cells; and releasing the at least one of the plurality of configurations.

Aspect 9: The method of any of aspects 1 through 8, wherein the second control message indicates that a context of the UE is relocated to the target cell.

Aspect 10: The method of any of aspects 1 through 9, wherein the second control message indicates that a TTT timer for performing the handover procedure shall expire or is reduced if the TTT timer is running.

Aspect 11: The method of any of aspects 1 through 10, wherein the second control message indicates that a TTT timer for performing the handover procedure shall expire or is reduced if the TTT timer is running.

Aspect 12: The method of any of aspects 1 through 11, wherein the second control message comprises a downlink control information message, a MAC-CE, or an RRC message.

Aspect 13: The method of any of aspects 1 through 12, wherein the second control message is specific to the UE or specific to a group of UEs including the UE.

Aspect 14: The method of any of aspects 1 through 13, wherein the UE, the source cell, and the target cell are operating in an NTN.

Aspect 15: A method for wireless communication at a source cell, comprising: transmitting a first control message to a UE comprising a configuration of a target cell for the UE to use to perform a handover procedure from the source cell to the target cell, the first control message being transmitted at a first time period; and transmitting a second control message to the UE triggering the UE to perform the handover procedure from the source cell to the target cell using the configuration of the target cell based at least in part on a triggering condition, the second control message being transmitted at a second time period, the second time period occurring after the first time period.

Aspect 16: The method of aspect 15, further comprising: transmitting, to the target cell, a request for the target cell to validate the configuration of the target cell included in the first control message.

Aspect 17: The method of aspect 16, further comprising: receiving, from the target cell, an acknowledgment that the configuration of the target cell is validated, wherein transmitting the second control message further comprises: transmitting the second control message based at least in part on receiving the acknowledgment.

Aspect 18: The method of any of aspects 15 through 17, further comprising: transmitting, to the target cell before the handover procedure is completed, a request to relocate a context of the UE; and receiving, from the target cell, a message indicating that relocation of the context of the UE is complete.

Aspect 19: The method of any of aspects 15 through 18, further comprising: transmitting, in the second control message, an indication of reserved resources for the UE to use to perform contention-free random-access to connect to the target cell or to perform the handover procedure to the target cell without a random-access procedure.

Aspect 20: The method of any of aspects 15 through 19, wherein the triggering condition corresponds to a time and speed of the target cell, a location of the UE, a measurement report received from the UE, or a combination thereof.

Aspect 21: The method of any of aspects 15 through 20, further comprising: receiving, from the UE, an indication that the handover procedure failed or was not initiated.

Aspect 22: The method of any of aspects 15 through 21, wherein the first control message comprises a plurality of configurations of a plurality of target cells for the UE to use to perform handover procedures to the plurality of target cells, the method further comprising: transmitting an indication to release at least one of the plurality of configurations of the plurality of target cells.

Aspect 23: A method for wireless communication at a target cell, comprising: receiving, from a source cell, a request for the target cell to validate a configuration of the target cell; transmitting an acknowledgment indicating that the configuration of the target cell is validated; and receiving an indication from a UE that a handover procedure from the source cell to the target cell is completed.

Aspect 24: The method of aspect 23, further comprising: receiving, from the source cell before the handover procedure is completed, a request to relocate a context of the UE; and transmitting, to the source cell, a message indicating that relocation of the context of the UE is complete.

Aspect 25: The method of aspect 24, further comprising: performing a path switch with a serving gateway to indicate to the serving gateway that the context of the UE is at the target cell.

Aspect 26: The method of any of aspects 23 through 25, wherein the UE, the source cell, and the target cell are operating in an NTN.

Aspect 27: A method for wireless communication at a UE, comprising: receiving, from a satellite at a first time period, a first control message comprising a configuration of a target cell to use at a second time period for performing a handover procedure from a source cell to the target cell, the second time period occurring after the first time period; and receiving, from the satellite at the second time period, a second control message triggering the UE to perform the handover procedure from the source cell to the target cell.

Aspect 28: The method of aspect 27, further comprising: performing the handover procedure from the source cell to the target cell using the configuration of the target cell included in the first control message in response to receiving the second control message.

Aspect 29: The method of any of aspects 27 through 28, wherein the handover procedure comprises a conditional handover procedure after receiving the second control message.

Aspect 30: The method of aspect 29, the method further comprising: determining that at least one criterion for performing the conditional handover procedure is satisfied; and performing the conditional handover procedure from the source cell to the target cell using the configuration of the target cell included in the first control message in response to receiving the second control message.

Aspect 31: The method of aspect 30, wherein determining that the at least one criterion is satisfied comprises: performing a measurement on the target cell; and determining that the measurement is greater than a threshold.

Aspect 32: The method of any of aspects 30 through 31, wherein determining that the at least one criterion is satisfied comprises: determining that a measurement report for the target cell is triggered.

Aspect 33: The method of any of aspects 30 through 32, wherein determining that the at least one criterion is satisfied comprises: performing a measurement on the target cell and the source cell; and determining that the measurement performed on the target cell is greater than or equal to the measurement performed on the source cell.

Aspect 34: The method of any of aspects 27 through 33, further comprising: receiving, in the second control message, an indication of reserved resources for performing contention-free random-access to connect to the target cell or for performing the handover procedure to the target cell without a random-access procedure.

Aspect 35: The method of any of aspects 27 through 34, further comprising: attempting to perform the handover procedure from the source cell to the target cell using the configuration of the target cell included in the first control message in response to receiving the second control message; and determining that the handover procedure from the source cell to the target cell failed.

Aspect 36: The method of aspect 35, further comprising: selecting a cell with which the UE is to establish a connection; and establishing the connection with the selected cell using the configuration of the target cell received in the first control message.

Aspect 37: The method of any of aspects 35 through 36, further comprising: transmitting, to the source cell, an indication that the handover procedure failed, wherein the indication that the handover procedure failed comprises a response to the second control message or a latest measurement report.

Aspect 38: The method of any of aspects 27 through 37, further comprising: determining not to initiate the handover procedure from the source cell to the target cell.

Aspect 39: The method of aspect 38, further comprising: selecting a cell with which the UE is to establish a connection; and establishing the connection with the selected cell using the configuration of the target cell received in the first control message.

Aspect 40: The method of any of aspects 38 through 39, further comprising: transmitting, to the source cell, an indication that the handover procedure was not initiated, wherein the indication that the handover procedure was not initiated comprises a response to the second control message or a latest measurement report.

Aspect 41: The method of any of aspects 27 through 40, wherein the first control message comprises a plurality of configurations of a plurality of target cells to use for performing handover procedures to the plurality of target cells.

Aspect 42: The method of aspect 41, further comprising: receiving an indication to release at least one of the plurality of configurations of the plurality of target cells; and releasing the at least one of the plurality of configurations.

Aspect 43: The method of any of aspects 27 through 42, wherein the second control message indicates that a context of the UE is relocated to the target cell.

Aspect 44: The method of any of aspects 27 through 43, wherein the second control message indicates that a TTT timer for performing the handover procedure shall expire or is reduced if the TTT timer is running.

Aspect 45: The method of any of aspects 27 through 44, wherein the second control message comprises a downlink control information message, a MAC control element, or an RRC message.

Aspect 46: The method of any of aspects 27 through 45, wherein the second control message is specific to the UE or specific to a group of UEs including the UE.

Aspect 47: The method of any of aspects 27 through 46, wherein the UE, the source cell, and the target cell are operating in an NTN.

Aspect 48: A method for wireless communication at a source cell, comprising: transmitting a first control message to a UE comprising a configuration of a target cell for the UE to use to perform a handover procedure from the source cell to the target cell, the first control message being transmitted at a first time period; determining to trigger the UE to perform the handover procedure from the source cell to the target cell; and transmitting a second control message to the UE triggering the UE to perform the handover procedure from the source cell to the target cell using the configuration of the target cell based at least in part on the determining, the second control message being transmitted at a second time period, the second time period occurring after the first time period.

Aspect 49: The method of aspect 48, further comprising: transmitting, to the target cell, a request for the target cell to validate the configuration of the target cell included in the first control message.

Aspect 50: The method of aspect 49, further comprising: receiving, from the target cell, an acknowledgment that the configuration of the target cell is validated, wherein transmitting the second control message is based at least in part on receiving the acknowledgment.

Aspect 51: The method of any of aspects 48 through 50, further comprising: transmitting, to the target cell before the handover procedure is completed, a request to relocate a context of the UE; and receiving, from the target cell, a message indicating that relocation of the context of the UE is complete.

Aspect 52: The method of any of aspects 48 through 51, further comprising: transmitting, in the second control message, an indication of reserved resources for the UE to use to perform contention-free random-access to connect to the target cell or to perform the handover procedure to the target cell without a random-access procedure.

Aspect 53: The method of any of aspects 48 through 52, wherein determining to trigger the UE to perform the handover procedure from the source cell to the target cell is based at least in part on a time and speed of the target cell, a location of the UE, a measurement report received from the UE, or a combination thereof.

Aspect 54: The method of any of aspects 48 through 53, further comprising: receiving, from the UE, an indication that the handover procedure failed or was not initiated.

Aspect 55: The method of aspect 54, wherein the indication that the handover procedure failed or was not initiated comprises a response to the second control message or a latest measurement report.

Aspect 56: The method of any of aspects 48 through 55, wherein the first control message comprises a plurality of configurations of a plurality of target cells for the UE to use to perform handover procedures to the plurality of target cells.

Aspect 57: The method of aspect 56, further comprising: transmitting an indication to release at least one of the plurality of configurations of the plurality of target cells.

Aspect 58: The method of any of aspects 48 through 57, wherein the second control message indicates that a context of the UE is relocated to the target cell.

Aspect 59: The method of any of aspects 48 through 58, wherein the second control message indicates that a TTT timer at the UE for performing the handover procedure shall expire or is reduced if the TTT timer is running.

Aspect 60: The method of any of aspects 48 through 59, wherein the second control message comprises a downlink control information message, a MAC control element, or an RRC message.

Aspect 61: The method of any of aspects 48 through 60, wherein the second control message is specific to the UE or specific to a group of UEs including the UE.

Aspect 62: The method of any of aspects 48 through 61, wherein the UE, the source cell, and the target cell are operating in an NTN.

Aspect 63: A method for wireless communication at a target cell, comprising: receiving, from a source cell, a request for the target cell to validate a configuration of the target cell, the configuration being stored at a UE; transmitting an acknowledgment indicating that the configuration of the target cell is validated; and receiving an indication from the UE that a handover procedure from the source cell to the target cell is completed.

Aspect 64: The method of aspect 63, further comprising: receiving, from the source cell before the handover procedure is completed, a request to relocate a context of the UE; and transmitting, to the source cell, a message indicating that relocation of the context of the UE is complete.

Aspect 65: The method of aspect 64, further comprising: performing a path switch with a serving gateway to indicate to the serving gateway that the context of the UE is at the target cell.

Aspect 66: The method of any of aspects 63 through 65, wherein the UE, the source cell, and the target cell are operating in an NTN.

Aspect 67: An apparatus for wireless communication at a UE, comprising a processor, and memory coupled to the processor, the processor and memory configured to perform a method of any of aspects 1 through 14.

Aspect 68: An apparatus for wireless communication at a UE, comprising at least one means for performing a method of any of aspects 1 through 14.

Aspect 69: A non-transitory computer-readable medium storing code for wireless communication at a UE, the code comprising instructions executable by a processor to perform a method of any of aspects 1 through 14.

Aspect 70: An apparatus for wireless communication at a source cell, comprising a processor, and memory coupled to the processor, the processor and memory configured to perform a method of any of aspects 15 through 22.

Aspect 71: An apparatus for wireless communication at a source cell, comprising at least one means for performing a method of any of aspects 15 through 22.

Aspect 72: A non-transitory computer-readable medium storing code for wireless communication at a source cell, the code comprising instructions executable by a processor to perform a method of any of aspects 15 through 22.

Aspect 73: An apparatus for wireless communication at a target cell, comprising a processor, and memory coupled to the processor, the processor and memory configured to perform a method of any of aspects 23 through 26.

Aspect 74: An apparatus for wireless communication at a target cell, comprising at least one means for performing a method of any of aspects 23 through 26.

Aspect 75: A non-transitory computer-readable medium storing code for wireless communication at a target cell, the code comprising instructions executable by a processor to perform a method of any of aspects 23 through 26.

Aspect 76: An apparatus for wireless communication at a UE, comprising a processor, and memory coupled to the processor, the processor and memory configured to perform a method of any of aspects 27 through 47.

Aspect 77: An apparatus for wireless communication at a UE, comprising at least one means for performing a method of any of aspects 27 through 47.

Aspect 78: A non-transitory computer-readable medium storing code for wireless communication at a UE, the code comprising instructions executable by a processor to perform a method of any of aspects 27 through 47.

Aspect 79: An apparatus for wireless communication at a source cell, comprising a processor, and memory coupled to the processor, the processor and memory configured to perform a method of any of aspects 48 through 62.

Aspect 80: An apparatus for wireless communication at a source cell, comprising at least one means for performing a method of any of aspects 48 through 62.

Aspect 81: A non-transitory computer-readable medium storing code for wireless communication at a source cell, the code comprising instructions executable by a processor to perform a method of any of aspects 48 through 62.

Aspect 82: An apparatus for wireless communication at a target cell, comprising a processor, and memory coupled to the processor, the processor and memory configured to perform a method of any of aspects 63 through 66.

Aspect 83: An apparatus for wireless communication at a target cell, comprising at least one means for performing a method of any of aspects 63 through 66.

Aspect 84: A non-transitory computer-readable medium storing code for wireless communication at a target cell, the code comprising instructions executable by a processor to perform a method of any of aspects 63 through 66.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    a processor; and
    memory coupled with the processor, the processor and memory configured to:
        receive, from a satellite at a first time period, a first control message comprising a configuration of a target cell to use at a second time period for performing a handover procedure from a source cell to the target cell, the second time period occurring after the first time period;
        store the configuration of the target cell included in the first control message;
        receive, from the satellite, a second control message at the second time period based at least in part on storing the configuration included in the first control message, the second control message triggering the UE to use the configuration included in the first control message to perform the handover procedure from the source cell to the target cell, the second control message being different from the first control message, wherein the second control message indicates that a context of the UE is relocated to the target cell, and wherein the UE is configured to store the configuration for a duration at least from receiving the first control message until receiving the second control message; and
        perform the handover procedure from the source cell to the target cell using the configuration of the target cell included in the first control message in response to receiving the second control message.

2. The apparatus of claim 1, wherein the first control message comprises an indication of the second time period.

3. The apparatus of claim 1, wherein the handover procedure comprises a conditional handover procedure after receiving the second control message, the processor and memory further configured to:
    perform that conditional handover procedure based at least in part on at least one criterion for performing the conditional handover procedure being satisfied.

4. The apparatus of claim 1, the processor and memory further configured to:
    receive, in the second control message, an indication of reserved resources for performing contention-free random-access to connect to the target cell or for performing the handover procedure to the target cell without a random-access procedure.

5. The apparatus of claim 1, the processor and memory further configured to:
    select a cell different from the target cell with which the UE is to establish a connection based at least in part on a failure of the handover procedure or aborting the handover procedure; and
    establish the connection with the cell using the configuration of the target cell received in the first control message.

6. The apparatus of claim 1, the processor and memory further configured to:
    transmit, to the source cell, an indication that the handover procedure failed or was aborted at some point, wherein the indication that the handover procedure failed or was aborted at some point comprises a response to the second control message or a latest measurement report.

7. The apparatus of claim 1, wherein the first control message comprises a plurality of configurations of a plurality of target cells to use for performing handover procedures to the plurality of target cells.

8. The apparatus of claim 7, the processor and memory further configured to:
    receive an indication to release at least one of the plurality of configurations of the plurality of target cells; and
    release the at least one of the plurality of configurations.

9. The apparatus of claim 1, wherein the second control message indicates that a time-to-trigger (TTT) timer for performing the handover procedure shall expire or is reduced if the TTT timer is running.

10. The apparatus of claim 1, wherein the second control message indicates that resources reserved for at least one of a plurality of target cells are activated or provides a new resource for performing synchronization to at least one of the plurality of target cells.

11. The apparatus of claim 1, wherein the second control message comprises a downlink control information message, a medium access control (MAC) control element (MAC-CE), or a radio resource control (RRC) message.

12. The apparatus of claim 1, wherein the second control message is specific to the UE or specific to a group of UEs including the UE.

13. The apparatus of claim 1, wherein the UE, the source cell, and the target cell are operating in a non-terrestrial network.

14. An apparatus for wireless communication at a source cell, comprising:
    a processor; and
    memory coupled with the processor, the processor and memory configured to:
        transmit a first control message to a user equipment (UE) comprising a configuration of a target cell for the UE to use at a second time period to perform a handover procedure from the source cell to the target cell, the first control message being transmitted at a first time period, wherein the UE is configured to store the configuration for a duration at least from the first time period until the second time period, the second time period being associated with a second control message; and
        transmit the second control message to the UE triggering the UE to use the configuration included in the first control message and stored at the UE to perform the handover procedure from the source cell to the target cell based at least in part on a triggering condition, the second control message being transmitted at the second time period based at least in part on receiving the configuration included in the first control message and being different from the first control message, the second time period occurring after the first time period, wherein the second control message indicates that a context of the UE is relocated to the target cell.

15. The apparatus of claim 14, the processor and memory further configured to:
    transmit, to the target cell, a request for the target cell to validate the configuration of the target cell included in the first control message.

16. The apparatus of claim 15, the processor and memory further configured to:
    receive, from the target cell, an acknowledgment that the configuration of the target cell is validated, wherein transmitting the second control message further comprises:
    transmit the second control message based at least in part on receiving the acknowledgment.

17. The apparatus of claim 14, the processor and memory further configured to:
    transmit, to the target cell before the handover procedure is completed, a request to relocate a context of the UE; and
    receive, from the target cell, a message indicating that relocation of the context of the UE is complete.

18. The apparatus of claim 14, the processor and memory further configured to:
    transmit, in the second control message, an indication of reserved resources for the UE to use to perform contention-free random-access to connect to the target cell or to perform the handover procedure to the target cell without a random-access procedure.

19. The apparatus of claim 14, wherein the triggering condition corresponds to a time and speed of the target cell, a location of the UE, a measurement report received from the UE, or a combination thereof.

20. The apparatus of claim 14, the processor and memory further configured to:
    receive, from the UE, an indication that the handover procedure failed or was not initiated.

21. The apparatus of claim 14, wherein the first control message comprises a plurality of configurations of a plurality of target cells for the UE to use to perform handover procedures to the plurality of target cells, the processor and memory further configured to:
    transmit an indication to release at least one of the plurality of configurations of the plurality of target cells.

22. An apparatus for wireless communication at a target cell, comprising:
    a processor; and
    memory coupled with the processor, the processor and memory configured to:
        receive, from a source cell, a request for the target cell to validate a configuration of the target cell, wherein the request comprises the configuration of the target cell and the configuration comprises one or more resources for a user equipment (UE) to use for a handover procedure;
        transmit an acknowledgment indicating that the configuration of the target cell is validated based at least in part on receiving the request for the target cell to validate the configuration, the acknowledgment further indicating that the one or more resources indicated via the configuration are validated; and
        receive an indication from the UE that the handover procedure from the source cell to the target cell is completed.

23. The apparatus of claim 22, the processor and memory further configured to:
    receive, from the source cell before the handover procedure is completed, a request to relocate a context of the UE; and
    transmit, to the source cell, a message indicating that relocation of the context of the UE is complete.

24. The apparatus of claim 23, the processor and memory further configured to:
    perform a path switch with a serving gateway to indicate to the serving gateway that the context of the UE is at the target cell.

25. The apparatus of claim 22, wherein the UE, the source cell, and the target cell are operating in a non-terrestrial network.

26. A method for wireless communication at a user equipment (UE), comprising:
    receiving, from a satellite at a first time period, a first control message comprising a configuration of a target cell to use at a second time period for performing a handover procedure from a source cell to the target cell, the second time period occurring after the first time period;
    storing the configuration of the target cell included in the first control message;
    receiving, from the satellite, a second control message at the second time period based at least in part on storing the configuration included in the first control message, the second control message triggering the UE to use the configuration included in the first control message to perform the handover procedure from the source cell to the target cell, the second control message being different from the first control message, wherein the second control message indicates that a context of the UE is relocated to the target cell, and wherein the configuration is stored by the UE for a duration at least from receiving the first control message until receiving the second control message; and performing the handover procedure from the source cell to the target cell using the configuration of the target cell stored by the UE and included in the first control message in response to receiving the second control message.

27. The method of claim 26, wherein the handover procedure comprises a conditional handover procedure after receiving the second control message and performing the handover procedure further comprises:

performing that conditional handover procedure based at least in part on at least one criterion for performing the conditional handover procedure being satisfied.

28. The method of claim 26, further comprising:

receiving, in the second control message, an indication of reserved resources for performing contention-free random-access to connect to the target cell or for performing the handover procedure to the target cell without a random-access procedure.

29. The method of claim 26, further comprising:

selecting a cell different from the target cell with which the UE is to establish a connection based at least in part on a failure of the handover procedure or aborting the handover procedure; and establishing the connection with the cell using the configuration of the target cell received in the first control message.

* * * * *